(12) United States Patent
Maruyama

(10) Patent No.: US 8,254,451 B2
(45) Date of Patent: Aug. 28, 2012

(54) IMAGE CODING APPARATUS, IMAGE CODING METHOD, IMAGE CODING INTEGRATED CIRCUIT, AND CAMERA

(75) Inventor: Yuki Maruyama, Osaka (JP)

(73) Assignee: Panasonic Corporation, Osaka (JP)

( * ) Notice: Subject to any disclaimer, the term of this patent is extended or adjusted under 35 U.S.C. 154(b) by 542 days.

(21) Appl. No.: 12/535,110

(22) Filed: Aug. 4, 2009

(65) Prior Publication Data

US 2010/0033594 A1 Feb. 11, 2010

(30) Foreign Application Priority Data

Aug. 5, 2008 (JP) ................................. 2008-201521
Jul. 30, 2009 (JP) ................................. 2009-178444

(51) Int. Cl.
*H04N 11/02* (2006.01)
*H04N 7/32* (2006.01)
*G06K 9/36* (2006.01)

(52) U.S. Cl. ......... 375/240.14; 375/240.16; 375/240.24; 382/232; 382/236

(58) Field of Classification Search ............ 375/240.14, 375/240.16; 348/222.1, 232
See application file for complete search history.

(56) References Cited

U.S. PATENT DOCUMENTS

| 2003/0099294 | A1* | 5/2003 | Wang et al. | 375/240.15 |
| 2004/0146109 | A1* | 7/2004 | Kondo et al. | 375/240.16 |
| 2004/0151248 | A1* | 8/2004 | Kondo et al. | 375/240.16 |
| 2004/0161033 | A1 | 8/2004 | Notoya et al. | |
| 2004/0264570 | A1* | 12/2004 | Kondo et al. | 375/240.16 |
| 2005/0041742 | A1* | 2/2005 | Abe et al. | 375/240.24 |
| 2006/0239358 | A1 | 10/2006 | Soh et al. | |

OTHER PUBLICATIONS

ITU-T Recommendation H.264 (Nov. 2007), "Advanced video coding for generic and audiovisual services," Series H: Audiovisual and Multimedia Systems, pp. i-xix and 1-540.

* cited by examiner

*Primary Examiner* — Joseph Ustaris
*Assistant Examiner* — On S Mung
(74) *Attorney, Agent, or Firm* — Wenderoth Lind & Ponack, L.L.P.

(57) ABSTRACT

An image coding apparatus includes a reference index assignment unit that assigns reference indices to reference pictures which can be referred to by a current picture to be coded, each of the reference indices having a different value and being assigned to a corresponding one of the plural reference pictures. An image coding unit performs field-coding on the current picture to be coded, by referring to the reference pictures indicated by the reference indices assigned by the reference index assignment unit, and codes the reference indices. The reference index assignment unit assigns, to one of two reference pictures included in the plural reference pictures, a reference index having a value smaller than a value of a reference index to be assigned to the other reference picture. One of the two reference pictures is temporally closer to the current picture to be coded.

7 Claims, 14 Drawing Sheets

FIG. 5
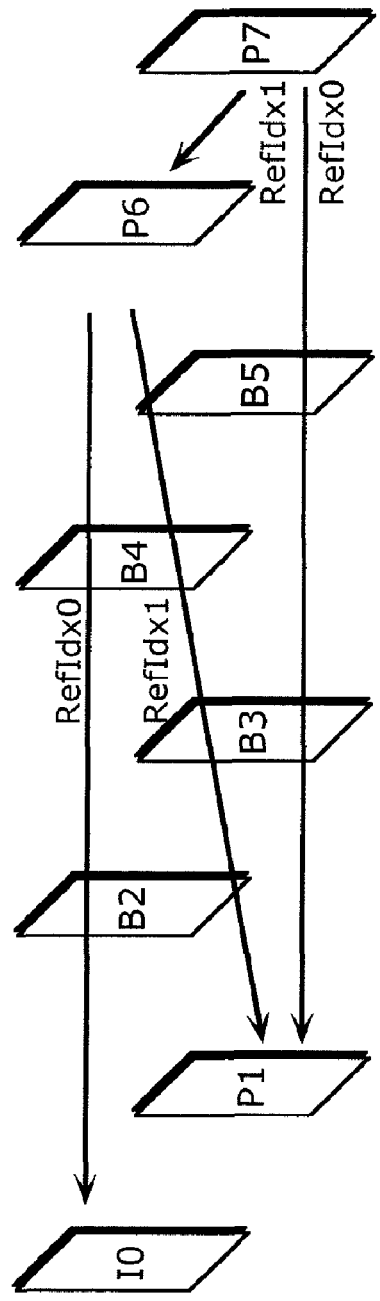
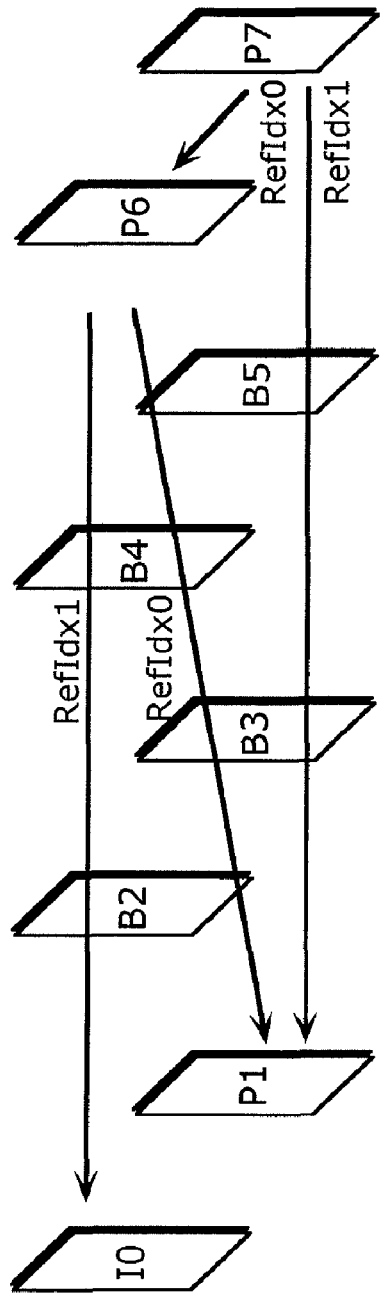

FIG. 6
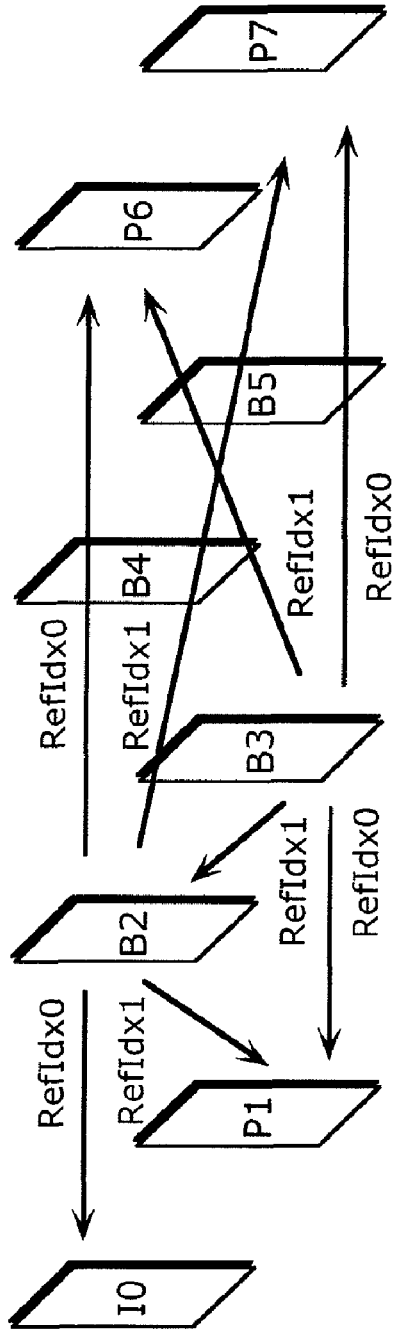
(a)
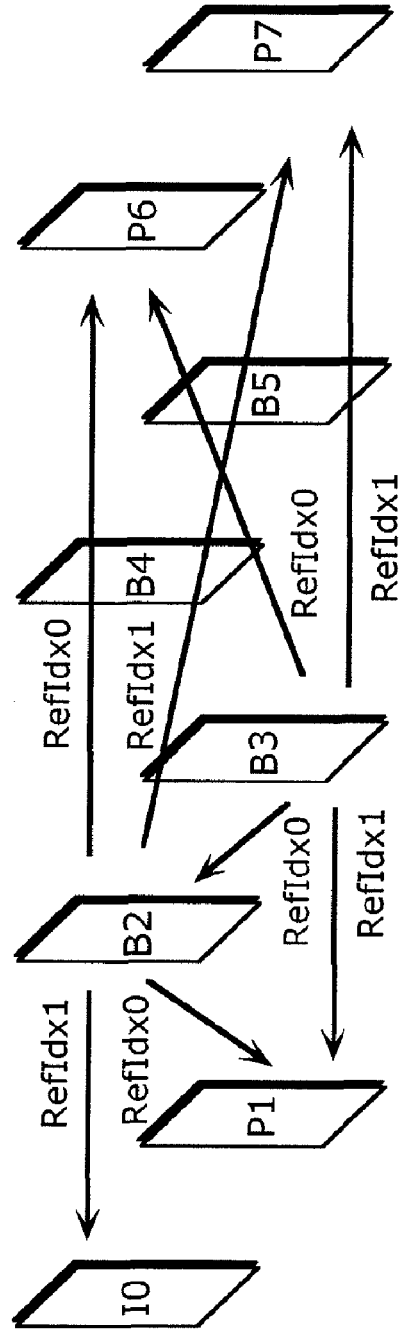
(b)

FIG. 7
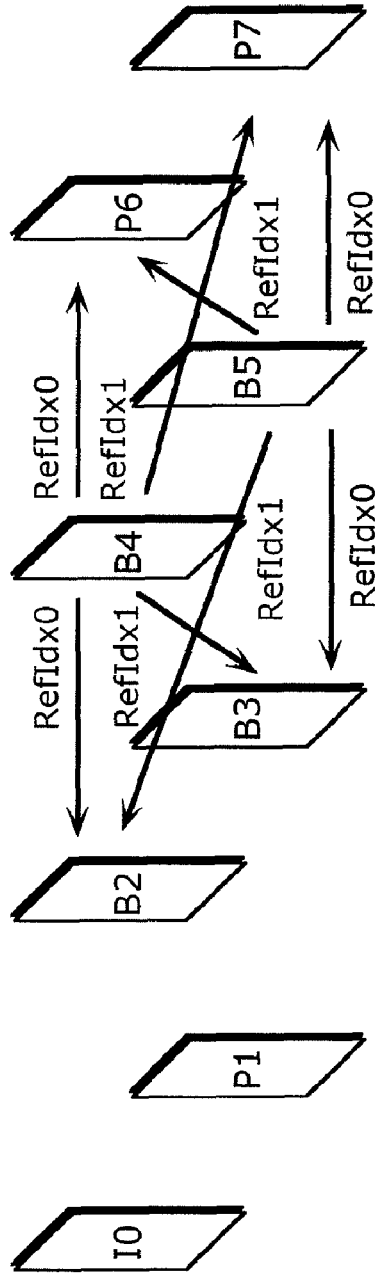
(a) Reference method corresponding to motion flag information indicating OFF
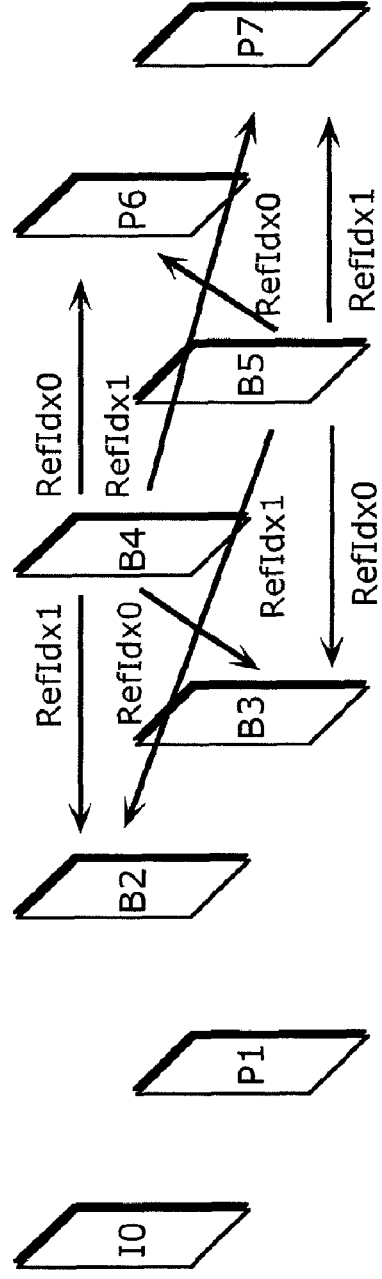
(b) Reference method corresponding to motion flag information indicating ON

IMAGE CODING APPARATUS, IMAGE CODING METHOD, IMAGE CODING INTEGRATED CIRCUIT, AND CAMERA

BACKGROUND OF THE INVENTION (1) Field of the Invention

The present invention relates to an image coding apparatus and an image coding method for compression-coding images and recording the resulting images on a storage medium such as an optical disk, a magnetic disk, or a flash memory. The present invention particularly relates to an image coding apparatus, an image coding method, an image coding integrated circuit, and a camera for compression-coding images in accordance with the MPEG-4 AVC/H.264 (hereinafter abbreviated as H.264) compression-coding standard.

(2) Description of the Related Art

Along with advances of digital video technology, a technology for compression-coding digital video data is in the process of being developed to handle increasing amount of data. Such development can be seen in the form of a compression-coding technology that is specifically designed for handling video data by making use of video data characteristics.

Further, increased processing capacity of information processing appliances such as computers has enabled complex operations involved in the compression-coding technology, and resulted in significant increase in video data compression rate.

For example, the compression-coding technology adopted in satellite and terrestrial digital high-definition broadcasts is a compression-coding scheme known as Moving Picture Experts Group phase 2 (MPEG-2). For example, as for the satellite digital high-definition broadcast, video data is compressed to approximately one-thirtieth using MPEG-2.

The H.264 compression-coding standard, which is one of the video data compression-coding schemes standardized after MPEG-2, is said to achieve a compression rate approximately twice higher than that of MPEG-2.

H.264 is adopted also as a video data compression scheme for Blu-ray, which is a standard of optical disks, and for Advanced Video Codec High Definition (AVCHD), which is a standard for recording high-definition images using a camcorder. This shows the expectations for wide application of H.264.

H.264, however, involves a significantly increasing amount of operations compared to MPEG-2, because as disclosed in Non-Patent Reference 1 (ITU-T Recommendation H.264), H.264 achieves a high compression rate by implementing combinations of many compression techniques.

In compression-coding video data, the amount of information is generally compressed by reducing temporal and spatial redundancy. To be more specific, with inter-picture prediction coding which aims at reducing temporal redundancy, an amount of motion (motion vector) is detected on a block-by-block (macroblock-by-macroblock) basis by referring to a preceding or following picture, and prediction is performed with the detected motion vector taken into account, so that the prediction accuracy increases and thus the coding efficiency improves.

For example, the amount of information necessary for coding is reduced by detecting a motion vector of a current picture to be coded and coding the difference between a predicted value which is a value shifted by the amount indicated by the motion vector and a predicted value of the current picture to be coded.

When coding is performed using a motion vector, the motion vector is also coded and recorded or transmitted, because information of the motion vector is necessary for decoding. Here, a picture referred to at the time of detecting a motion vector is called a reference picture. Further, a picture is a term indicating one picture plane.

The motion vector is detected on a block-by-block basis. More specifically, while a block of a current picture to be coded (block to be coded) is fixed, a block of a reference picture (reference block) is shifted within a search range. The motion vector is then detected by finding the position of the reference block that most strongly resembles the block to be coded.

This processing of searching for a motion vector is called motion vector detection. The determination as to the block resemblance is generally performed using an error between the block to be coded and the reference block. In particular, a summed absolute difference (SAD) is often used.

Since searching for a reference block within an entire reference picture results in a great amount of operations, it is a general practice to limit the range for the search within the reference picture. The limited range is called a search range.

Further, pictures coded without inter-picture prediction but coded by only using intra-picture prediction, which is aimed at reducing the spatial redundancy, are called I-pictures; pictures coded using inter-picture prediction with reference to one reference picture are called P-pictures; and pictures coded using inter-picture prediction with reference to a maximum of two reference pictures are called B-pictures.

It is to be noted that B-pictures can refer to any combination of two pictures; a first reference picture is called a reference picture in L0 prediction, and a second reference picture is called a reference picture in L1 prediction.

According to the H.264 compression-coding standard, a reference picture can be selected from among plural previously coded pictures. Each reference picture selected is managed with a variable called reference index, which is coded at the time of coding a motion vector, as information indicating which picture is pointed to by the motion vector.

The reference index takes a value equal to or greater than 0, and as the value decreases, so does the amount of information after being coded (coded amount). Further, the setting of the reference index assignment to each reference picture can be freely made. Thus, it is possible to enhance the coding efficiency by assigning a reference index of a smaller number to a reference picture which many motion vectors point to.

For example, according to Context-based Adaptive Binary Arithmetic Coding (CABAC), which is a type of arithmetic coding adopted by the H.264 compression-coding standard, data to be coded is subject to binarization and arithmetic coding.

Thus, the reference index is also subject to binarization and arithmetic coding. Here, the code length after binarization (binary signal length) is three bits when the reference index is "2", and two bits when the reference index is "1". Further, the code length after binarization (binary signal length) is one bit when the reference index is "0".

As can be understood, the binary signal length is shorter as the value of the reference index is smaller. Therefore, the eventual coded amount obtained by coding the reference index also tends to decrease as the value of the reference index decreases.

The reference index has been conventionally assigned using a method of assigning, to a reference picture having the same parity as that of the current picture to be coded, a reference index of a number smaller than that of a reference picture having a parity opposite to that of the current picture to be coded, for example.

This method is used in many camcorders having an image recording function in accordance with the H.264 compression-coding standard. Here, the reference picture having the same parity as that of the current picture to be coded is a reference picture that belongs to the same field as the current picture to be coded.

For example, when the current picture to be coded is a top field, a reference picture that belongs to a top field is the reference picture having the same parity.

On the other hand, the reference picture having a parity opposite to that of the current picture to be coded is a reference picture that belongs to a field different from the field of the current picture to be coded. For example, when the current picture to be coded is a top field, a reference picture that belongs to a bottom field is the reference picture having the opposite parity.

With reference to FIG. 15, a description is provided of a conventional method of reference index assignment in the case where a current picture is to be coded as a P-picture.

FIG. 15 shows an example of the conventional method of reference index assignment in the case where a current picture is to be coded as a P-picture.

In FIG. 15, a picture I0 is a picture to be coded as an I-picture, pictures P1, P6, and P7 are pictures to be coded as P-pictures, and pictures B2, B3, B4, and B5 are pictures to be coded as B-pictures. These pictures are illustrated in the order in which they are provided to an image coding apparatus 100.

It is to be noted that the arrows in the diagram show that the picture pointed to by an arrow (reaching point) can be referred to for coding the picture located at the base of the arrow (starting point).

When a current picture is to be coded as a P-picture (pictures P6 and P7 in FIG. 15), as shown in FIG. 15, for example, one picture is selected between the pictures I0 and P1 for each macroblock of the picture P6 as a reference picture of the picture P6.

Further, a reference index 0 (shown as RefIdx0 in FIG. 15) is assigned to the picture I0 having the same parity as that of the picture P6 that is the current picture to be coded. Furthermore, a reference index 1 (shown as RefIdx1 in FIG. 15) is assigned to the picture P1 having a parity opposite to that of the picture P6 that is the current picture to be coded.

Likewise, one picture is selected between the pictures P1 and P6 for each macroblock of the picture P7 as a reference picture of the picture P7. Further, the reference index 0 is assigned to the picture P1 having the same parity as that of the picture P7 that is the current picture to be coded, and the reference index 1 is assigned to the picture P6 having a parity opposite to that of the picture P7 that is the current picture to be coded.

SUMMARY OF THE INVENTION

It can be said that the above conventional method of reference index assignment is desirable for scenes with small motions in the pictures. This is because there is higher correlation between the current picture to be coded and the reference picture having the same parity as that of the current picture to be coded than between the current picture to be coded and the reference picture having the opposite parity.

That is to say, this is because there is a greater number of motion vectors pointing to the reference picture having the same parity as that of the current picture to be coded than the number of motion vectors pointing to the reference picture having the opposite parity.

However, in scenes with large motions in the pictures, the correlation is higher between the current picture to be coded and the reference picture which is temporally closer to the current picture to be coded. Therefore, many motion vectors are detected which point to the reference picture temporally closer to the current picture to be coded.

For example, when a current picture is to be coded as a P-picture as shown in FIG. 15, a case is assumed where the current picture to be coded is from a scene with large motions in the pictures.

In this case, many motion vectors are selected that point to the reference picture which is temporally closer to the current picture to be coded and to which the reference index 1 is assigned. This results in a problem of deterioration in the coding efficiency.

The present invention has been conceived to solve the problem, and it is an object of the present invention to provide an image coding apparatus and so on that enhances the image quality and the coding efficiency without causing deterioration in the coding efficiency even in a scene with large motions in the pictures.

In order to achieve the above object, the image coding apparatus according to an aspect of the present invention is an image coding apparatus which performs field-coding on input image data, the apparatus including: a reference index assignment unit configured to assign reference indices to plural reference pictures which can be referred to by a current picture to be coded included in the input image data, each of the reference indices having a different value and being assigned to a corresponding one of the plural reference pictures; and an image coding unit configured to perform the field-coding on the current picture to be coded, by referring to the reference pictures indicated by the reference indices assigned by the reference index assignment unit, and to code the reference indices, wherein the reference index assignment unit is configured to assign, to one of two reference pictures included in the plural reference pictures, a reference index having a value smaller than a value of a reference index to be assigned to the other reference picture, the one of the two reference pictures being temporally closer to the current picture to be coded than the other reference picture.

This structure makes the coded amount of the reference index, which is coded at the time of coding each picture constituting a scene with large motions, less than the conventional amount. As a result, it is possible to enhance the image quality and the coding efficiency without causing deterioration in the coding efficiency even in a scene with large motions in the pictures.

In the case where the current picture to be coded is a picture to be field-coded as a P-picture, the reference index assignment unit may be configured to assign, to one of the two reference pictures which is temporally closer to the current picture to be coded and has a parity opposite to a parity of the current picture to be coded, a reference index having a value smaller than a value of a reference index to be assigned to the other reference picture having a same parity as the parity of the current picture to be coded.

In the case where the current picture to be coded is a picture to be field-coded as a B-picture and is a top field, the reference index assignment unit may be configured to assign, to one of the two reference pictures which is temporally closer to the current picture to be coded and has a parity opposite to a parity of the current picture to be coded, a reference index having a value smaller than a value of a reference index to be assigned to the other reference picture having a same parity as the parity of the current picture to be coded, the two reference pictures being temporally ahead of the current picture to be coded.

With this structure, the coded amount of the reference index can be smaller than the conventional amount according to the coding structure of the current picture to be coded. Further, since the reference index assignment is controlled according to the information determined before coding, processing delay, for example, does not occur.

The image coding apparatus may further include a determination unit configured to determine whether or not the current picture to be coded is a picture included in a group of successive pictures showing a motion of a predetermined or greater amount, and in the case where the determination unit determines that the current picture to be coded is included in the group of successive pictures, the reference index assignment unit may be configured to assign, to one of the two reference pictures which is temporally closer to the current picture to be coded, a reference index having a value smaller than a value of a reference index to be assigned to the other reference picture.

In the case where the determination unit does not determine that the current picture to be coded is included in the group of successive pictures, the reference index assignment unit may be further configured to assign, to the other reference picture having a same parity as a parity of the current picture to be coded, a reference index having a value smaller than a value of a reference index to be assigned to the one of the two reference pictures which has a parity opposite to the parity of the current picture to be coded.

This structure makes it possible to dynamically change the method of reference index assignment according to whether or not the current picture to be coded is a picture included in a scene with large motions.

The determination unit may be configured to determine that the current picture to be coded is included in the group of successive pictures in the case of obtaining information indicating that the current picture to be coded is included in video data which has been captured by zooming or panning.

With this structure, obtaining, from a camera which generates input image data for example, information indicating whether or not the camera is zooming or the like allows easy determination as to whether or not the input image data shows a large motion.

The determination unit may be configured to determine that the current picture to be coded is included in the group of successive pictures in the case where an amount of characteristics is equal to or greater than a predetermined threshold, the amount of characteristics being a value calculated from the current picture to be coded and a previous picture to be coded.

This structure allows determination as to whether or not the current picture to be coded is an image with a motion, using information obtained from video data including the current picture to be coded. That is to say, the determination is possible with better accuracy, and thus the image quality and the coding efficiency can be further enhanced.

The image coding unit may be configured to perform the field-coding on each of plural pictures including the current picture to be coded, and the determination unit may be configured to determine that the current picture to be coded is included in the group of successive pictures in the case where an amount of characteristics is equal to or greater than a predetermined threshold, the amount of characteristics being a value calculated from plural motion vectors used for the field-coding performed by the image coding unit prior to the field-coding of the current picture to be coded.

This structure allows determination as to whether or not the current picture to be coded is an image with a motion, using a previously coded picture. That is to say, the determination is possible with better accuracy, and thus the image quality and the coding efficiency can be further enhanced.

It is to be noted that the present invention can be realized not only as an image coding apparatus, but also as a camera including the image coding apparatus and an imaging unit.

The camera according to an aspect of the present invention may further include a shooting mode switching unit configured to switch between shooting modes of the camera, and in the case where the shooting mode switching unit switches a shooting mode of the camera to a predetermined shooting mode, the reference index assignment unit may be configured to assign, to one of the two reference pictures which is temporally closer to the current picture to be coded, a reference index having a value smaller than a value of a reference index to be assigned to the other reference picture.

The camera may further include a status obtaining unit configured to obtain status information indicating that the camera is panning or the camera is zooming, and in the case where the status obtaining unit obtains the status information, the reference index assignment unit may be configured to assign, to one of the two reference pictures which is temporally closer to the current picture to be coded, a reference index having a value smaller than a value of a reference index to be assigned to the other reference picture.

In addition, the present invention can be realized as a method including the processes performed by the processing units included in the image coding apparatus.

Moreover, the structural elements of the above-described image coding apparatus and camera may be partially or entirely included in one system LSI (Large Scale Integration). The system LSI is a super multi-functional LSI manufactured by integration of plural structural elements on one chip, and is specifically a computer system including a microprocessor, a ROM, a Random Access Memory (RAM) and so on.

According to the present invention, a reference index having a smaller value is assigned to a reference picture that is temporally closer to a current picture to be coded. This makes it possible to enhance the image quality and the coding efficiency without causing deterioration in the coding efficiency even in a scene with large motions in the pictures.

FURTHER INFORMATION ABOUT TECHNICAL BACKGROUND TO THIS APPLICATION

The disclosures of Japanese Patent Applications No. 2008-201521 filed on Aug. 5, 2008 and No. 2009-178444 filed on Jul. 30, 2009 each including specification, drawings and claims are incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 5 shows an example of a method, used by a reference index assignment unit of an image coding apparatus according to Embodiment 1 of the present invention, for determining a reference method for P-pictures;

FIG. 6 shows an example of a method, used by a reference index assignment unit of an image coding apparatus according to Embodiment 1 of the present invention, for determining a reference method for B-pictures;

FIG. 7 shows another example of a method, used by a reference index assignment unit of an image coding apparatus according to Embodiment 1 of the present invention, for determining a reference method for B-pictures;

DESCRIPTION OF THE INVENTION

Hereinafter, embodiments of the present invention will be described with reference to the drawings.

Embodiment 1

Figure 1:
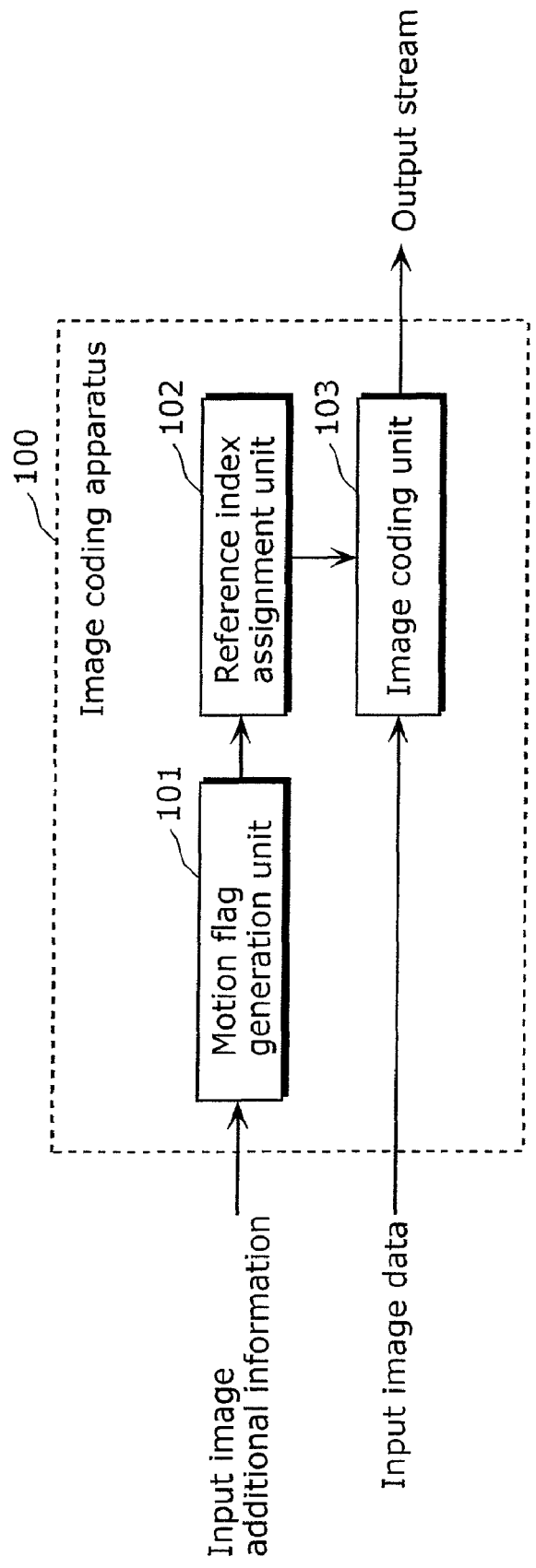
FIG. 1 is a block diagram showing the structure of an image coding apparatus according to Embodiment 1 of the present invention.

FIG. 1 is a block diagram showing the structure of an image coding apparatus 100 according to Embodiment 1 of the present invention.

The image coding apparatus 100 according to Embodiment 1 of the present invention receives input image data and input image additional information, which is additional information of the input image data.

The image coding apparatus 100 codes the received input image data in accordance with the H.264 compression-coding standard, and outputs the resultant as a stream.

It is to be noted that the coding in accordance with the H.264 compression-coding standard is performed on, as a unit of processing, one or more slices into which one picture is divided. In coding according to the H.264 compression-coding standard in Embodiment 1 of the present invention, one picture is treated as one slice. This applies also to later-described Embodiments 2 and 3 of the present invention.

As shown in FIG. 1, the image coding apparatus 100 includes a motion flag generation unit 101, a reference index assignment unit 102, and an image coding unit 103.

The motion flag generation unit 101 is an example of the determination unit of the image coding apparatus according to the present invention. The motion flag generation unit 101 according to the present embodiment receives input image additional information, which is additional information of the input image data. Further, the motion flag generation unit 101 outputs, to the reference index assignment unit 102, motion flag information which is generated based on the received input image additional information.

It is to be noted that the input image additional information is, for example, information indicating whether or not a camera that inputs image data to the image coding apparatus 100 is zooming; information indicating whether or not the camera is panning; and information indicating whether or not the camera is tilting.

The input image additional information indicating such contents is provided to the motion flag generation unit 101 by, for example, an acceleration sensor equipped in the camera.

In other words, the input image additional information is information indicating whether or not a current picture to be coded contained in the input image data is included in a group of successive pictures showing a large motion, such as video data which has been captured by zooming or panning. The input image additional information is provided to the image coding apparatus 100 together with the input image data, and is additional information of the input image data.

It is to be noted that "panning" also means "tilting" that is a technique of shooting video while horizontally rotating the camera.

The reference index assignment unit 102 is a processing unit which assigns reference indices to plural reference pictures which can be referred to by the current picture to be coded included in the input image data. Here, each of the reference indices has a different value and assigned to a corresponding one of the plural reference pictures.

The reference index assignment unit 102 outputs, to the image coding unit 103, information including the reference indices assigned in the above assigning processing, as reference index information.

A specific operation of the reference index assignment unit 102 will be described later.

According to the reference index information received from the reference index assignment unit 102, the image coding unit 103 performs compression-coding on image data of the current picture to be coded in accordance with the H.264 compression-coding standard.

Next, with reference to FIG. 2, the detailed structure of the image coding unit 103 will be described.

Figure 2:
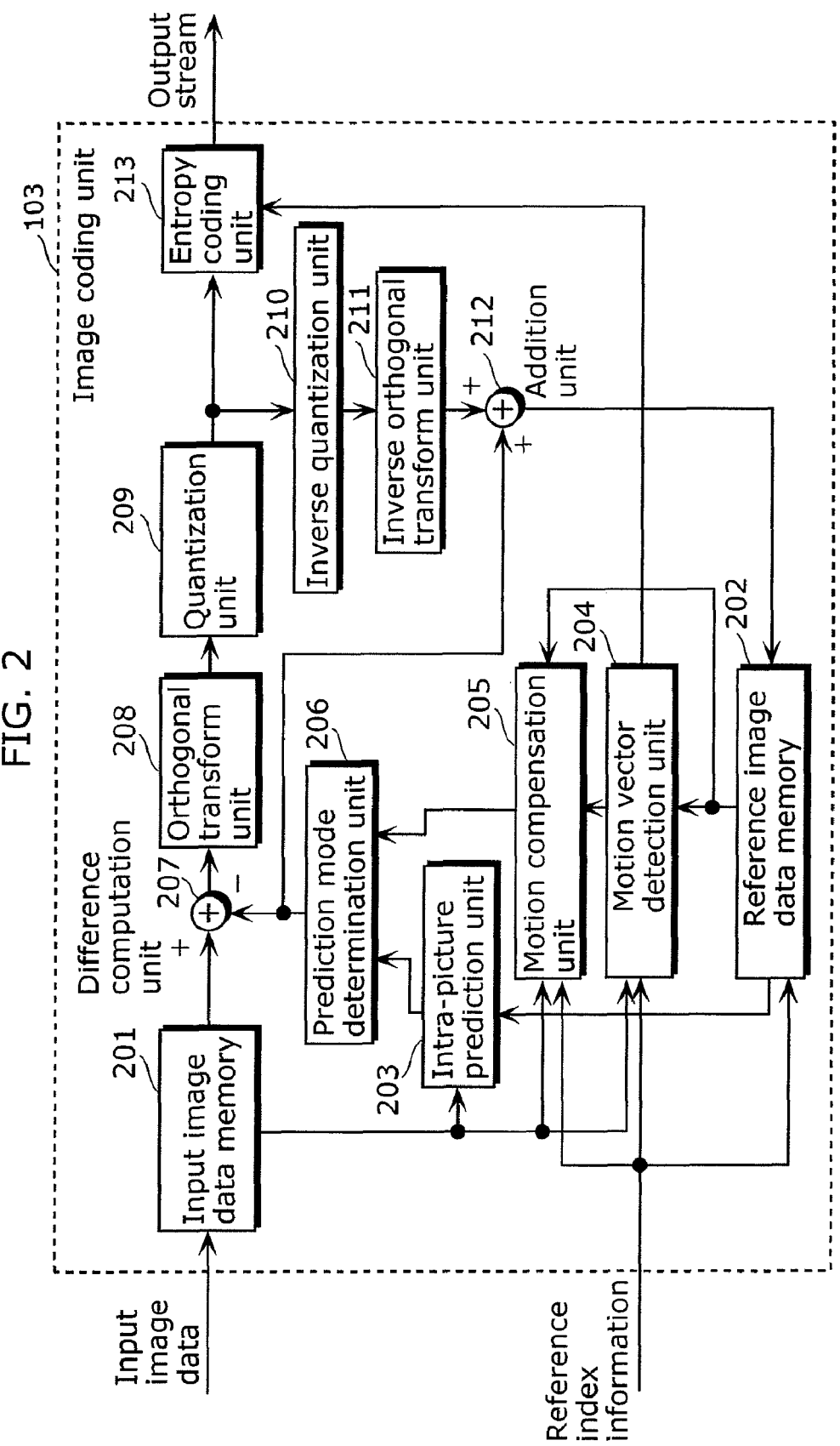
FIG. 2 is a block diagram showing the structure of an image coding unit of an image coding apparatus according to Embodiment 1 of the present invention.

FIG. 2 is a block diagram showing the structure of the image coding unit 103 of the image coding apparatus 100 according to Embodiment 1 of the present invention.

As shown in FIG. 2, the image coding unit 103 includes an input image data memory 201, a reference image data memory 202, an intra-picture prediction unit 203, a motion vector detection unit 204, a motion compensation unit 205, a prediction mode determination unit 206, a difference computation unit 207, an orthogonal transform unit 208, a quantization unit 209, an inverse quantization unit 210, an inverse orthogonal transform unit 211, an addition unit 212, and an entropy coding unit 213.

The input image data memory 201 is a memory which stores input image data. The information stored in the input image data memory 201 is referred to by the intra-picture prediction unit 203, the motion vector detection unit 204, the prediction mode determination unit 206, and the difference computation unit 207.

The motion vector detection unit 204 uses, as a search range, a locally decoded image stored in the reference image data memory 202, and detects an image area that most strongly resembles the input image, so as to determine a motion vector pointing at the position of the detected image area.

It is to be noted that the locally decoded image serving as the search range, that is, a reference picture, is identified using the reference index information received from the reference index assignment unit 102.

The motion vector detection unit 204 also determines the size of the current block to be coded having the smallest error and a motion vector corresponding to the size determined, and transmits the determined information to the motion compensation unit 205 and the entropy coding unit 213.

Using the motion vector included in the information received from the motion vector detection unit 204, the motion compensation unit 205 extracts, from the locally decoded image stored in the reference image data memory 202, an image area that is most suitable for a predicted image. The motion compensation unit 205 then generates a predicted image according to inter-picture prediction and outputs the predicted image to the prediction mode determination unit 206.

It is to be noted that the locally decoded image used for the inter-picture prediction, that is, a reference picture, is identified using the reference index information received from the reference index assignment unit 102.

The intra-picture prediction unit 203 performs intra-picture prediction using, from the locally decoded image stored in the reference image data memory 202, previously coded pixels of the current picture to be coded, and generates a predicted image according to intra-picture prediction. In addition, the intra-picture prediction unit 203 outputs the predicted image to the prediction mode determination unit 206.

The prediction mode determination unit 206 determines a prediction mode. Further, based on the prediction mode determination, the prediction mode determination unit 206 switches between the predicted image generated by the intra-picture prediction unit 203 and the predicted image generated by the motion compensation unit 205, and outputs the selected predicted image.

It is to be noted that the prediction mode determination unit 206 determines a prediction mode by, for example, calculating a summed absolute difference between pixels of the input image and pixels of the predicted image for both inter-picture prediction and intra-picture prediction. Then, the prediction mode with a smaller summed absolute difference is determined as the prediction mode to be used.

The difference computation unit 207 obtains image data to be coded from the input image data memory 201, and calculates a value of pixel difference between the obtained image data and the predicted image received from the prediction mode determination unit 206. Further, the difference computation unit 207 outputs the calculated pixel difference value to the orthogonal transform unit 208.

The orthogonal transform unit 208 transforms the pixel difference value received from the difference computation unit 207 into a frequency coefficient, and outputs the frequency coefficient to the quantization unit 209.

The quantization unit 209 quantizes the frequency coefficient received from the orthogonal transform unit 208, and outputs the quantized value to the entropy coding unit 213 and the inverse quantization unit 210 as data to be coded.

The inverse quantization unit 210 performs inverse quantization on the quantized value received from the quantization unit 209 to restore the quantized value to a frequency coefficient, and outputs the restored frequency coefficient to the inverse orthogonal transform unit 211.

The inverse orthogonal transform unit 211 performs inverse frequency transform on the frequency coefficient received from the inverse quantization unit 210 so that the frequency coefficient is transformed into a pixel difference value, and outputs the pixel difference value to the addition unit 212.

The addition unit 212 adds up the pixel difference value received from the inverse orthogonal transform unit 211 and the predicted image received from the prediction mode determination unit 206 to generate a locally decoded image. The addition unit 212 then outputs the locally decoded image to the reference image data memory 202.

Here, the locally decoded image stored in the reference image data memory 202 is basically the same as the input image stored in the input image data memory 201.

The locally decoded image, however, contains the results of the inverse quantization and the inverse orthogonal transform performed on the pixel difference value by the inverse quantization unit 210, the inverse orthogonal transform unit 211 and the like after the orthogonal transform and the quantization of the orthogonal transform unit 208, the quantization unit 209 and the like. Thus, the locally decoded image contains distortion components such as quantizing distortion.

According to the reference index information received from the reference index assignment unit 102, the reference image data memory 202 stores the locally decoded image received from the addition unit 212.

For example, when the reference index information indicates that the received locally decoded image is to be treated with the reference index 0, the locally decoded image is managed with assignment of tag information indicating the reference index 0.

This allows the motion vector detection unit 204 and the motion compensation unit 205 to identify a locally decoded image necessary for their respective processing as described above.

The entropy coding unit 213 performs entropy coding on the quantized value received from the quantization unit 209, the motion vector received from the motion vector detection unit 204 and so on, and outputs the coded data as an output stream.

Next, with reference to FIGS. 1 and 2, processing performed by the image coding apparatus 100 having the above structure will be described.

Initially, input image data is provided to the image coding unit 103 and input image additional information is provided to the motion flag generation unit 101.

The input image data is stored in the input image data memory 201 of the image coding unit 103. The input image data is made up of 1920×1080 pixels, for example.

The motion flag generation unit 101 determines whether or not a current picture to be coded is a picture included in a group of successive pictures showing a motion of a predetermined or greater amount, and generates motion flag information indicating the result of the determination.

In the present embodiment, the motion flag generation unit 101 refers to the input image additional information for the determination as to whether or not the current picture to be coded included in the input image data is a picture included in a group of successive pictures showing a motion of a predetermined or greater amount.

As a result, when determining that the current picture to be coded is a picture included in a group of successive pictures showing a motion of a predetermined or greater amount, the motion flag generation unit 101 generates motion flag information indicating ON. Otherwise, the motion flag generation unit 101 generates motion flag information indicating OFF. Further, the motion flag generation unit 101 outputs the motion flag information to the reference index assignment unit 102.

Next, with reference to FIG. 3, an example of processing performed by the motion flag generation unit 101 will be described.

Figure 3:
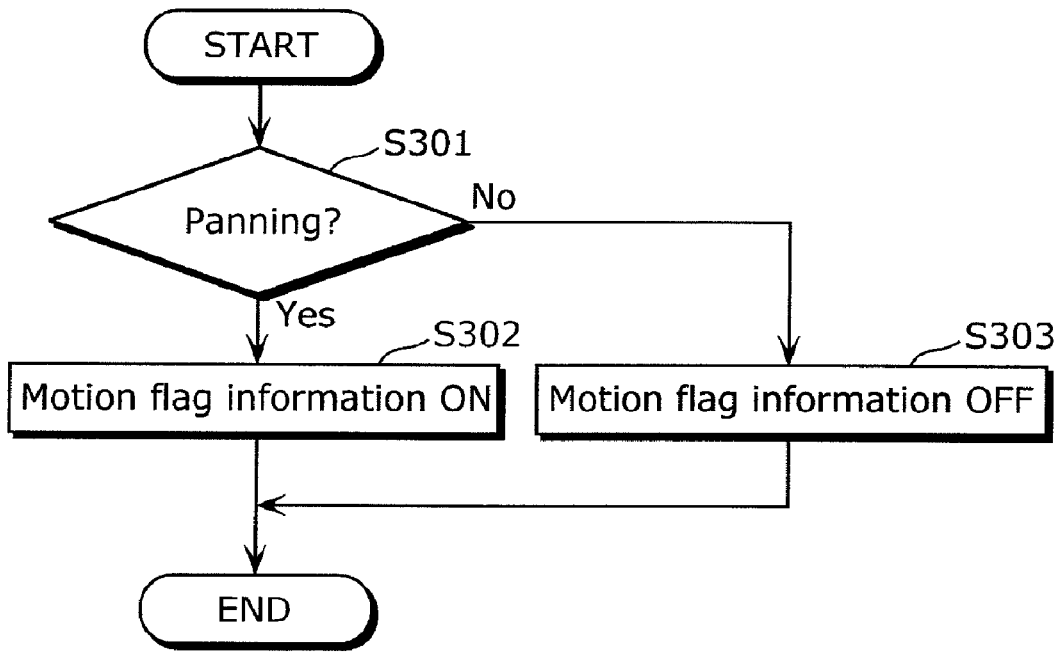
FIG. 3 is a flowchart showing an example of processing performed by a motion flag generation unit of an image coding apparatus according to Embodiment 1 of the present invention.

FIG. 3 is a flowchart showing an example of processing performed by the motion flag generation unit 101 of the image coding apparatus 100 according to Embodiment 1 of the present invention.

As shown in FIG. 3, the motion flag generation unit 101 determines whether or not the input image data has been captured and generated by panning a camera, for example, that is, whether or not the input image data has been captured by panning (S301).

When determining in S301 that the input image data has been captured by panning (Yes in S301), the motion flag generation unit 101 generates motion flag information indicating ON, and outputs the motion flag information to the reference index assignment unit 102 (S302).

When determining in S301 that the input image data has not been captured by panning (No in S301), the motion flag generation unit 101 generates motion flag information indicating OFF, and outputs the motion flag information to the reference index assignment unit 102 (S303).

Next, with reference to FIG. 4, an example of processing performed by the reference index assignment unit 102 will be described.

Figure 4:
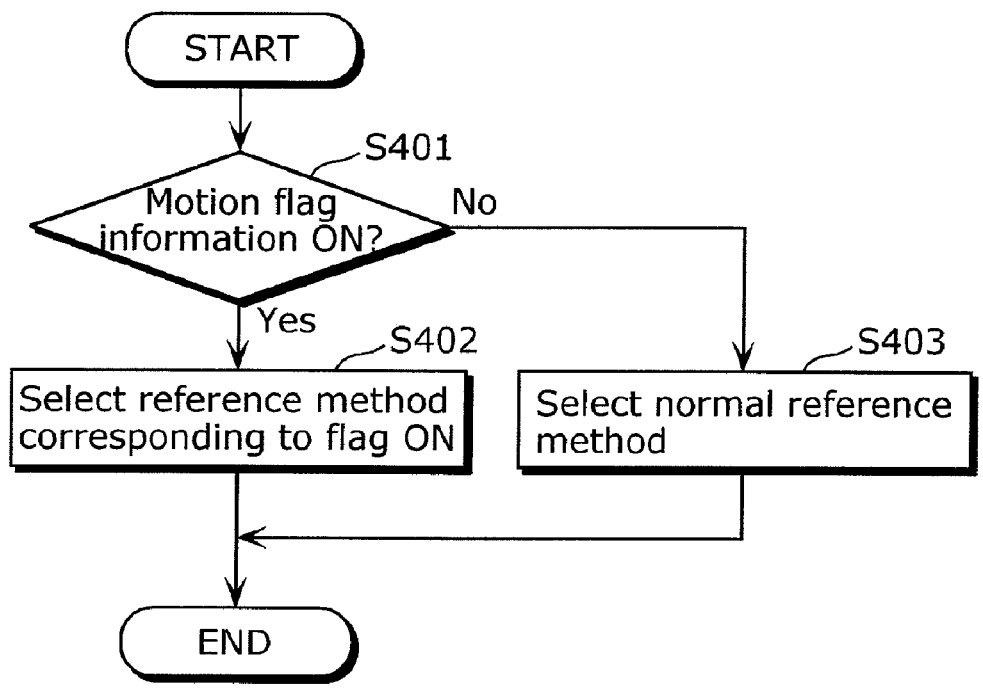
FIG. 4 is a flowchart showing an example of processing performed by a reference index assignment unit of an image coding apparatus according to Embodiment 1 of the present invention.

FIG. 4 is a flowchart showing an example of processing performed by the reference index assignment unit 102 of the image coding apparatus 100 according to Embodiment 1 of the present invention.

Based on the motion flag information received from the motion flag generation unit 101, the reference index assignment unit 102 determines information such as a reference method indicating how reference indices are to be assigned to reference pictures when a current picture is to be coded.

Further, the reference index assignment unit 102 outputs the determined information to the image coding unit 103 as reference index information.

The reference index assignment unit 102 determines whether the motion flag information received from the motion flag generation unit 101 indicates ON or OFF (S401). When determining in S401 that the motion flag information indicates ON (Yes in S401), the reference index assignment unit 102 selects a reference method corresponding to the motion flag indicating ON (S402).

When determining in S401 that the motion flag information indicates OFF, the reference index assignment unit 102 selects a reference method corresponding to the motion flag indicating OFF (S403).

The reference index assignment unit 102 outputs, to the image coding unit 103, reference index information indicating the selected reference method.

It is to be noted that the reference method corresponding to the motion flag indicating ON and the reference method corresponding to the motion flag indicating OFF will be described later in detail. To briefly describe the reference method corresponding to the motion flag indicating ON, it is a reference method of assigning a reference index having a smaller value to a reference picture temporally closer to the current picture to be coded.

The image coding unit 103 performs a series of compression-coding processing such as motion vector detection, motion compensation, intra-picture prediction, orthogonal transform, quantization, and entropy coding, based on the reference index information determined by the reference index assignment unit 102.

It is to be noted that Embodiment 1 of the present invention assumes that the image coding unit 103 performs compression-coding on input image data in accordance with the H.264 compression-coding standard. This applies also to later-described Embodiments 2 and 3 of the present invention.

Next, with reference to FIGS. 5, 6 and 7, the way in which the reference index assignment unit 102 determines a reference method will be described.

FIG. 5 shows an example of a method, used by the reference index assignment unit 102 of the image coding apparatus 100 according to Embodiment 1 of the present invention, for determining a reference method for P-pictures.

FIG. 6 shows an example of a method, used by the reference index assignment unit 102 of the image coding apparatus 100 according to Embodiment 1 of the present invention, for determining a reference method for B-pictures.

FIG. 7 shows another example of a method, used by the reference index assignment unit 102 of the image coding apparatus 100 according to Embodiment 1 of the present invention, for determining a reference method for B-pictures.

First, with reference to (a) and (b) in FIG. 5, an example of a method for determining a reference method for P-pictures will be described.

In FIG. 5, (a) specifically shows a reference method corresponding to the motion flag information indicating OFF, and (b) specifically shows a reference method corresponding to the motion flag information indicating ON, in the case where a current picture is to be coded as a P-picture.

In (a) and (b) of FIG. 5, a picture I0 is a picture to be coded as an I-picture, pictures P1, P6, and P7 are pictures to be coded as P-pictures, and pictures B2, B3, B4, and B5 are pictures to be coded as B-pictures.

These pictures are shown in time order. Further, the arrows in the diagram show that the picture pointed to by an arrow (reaching point) can be referred to for coding the picture located at the base of the arrow (starting point).

When a current picture is to be coded as a P-picture (pictures P6 and P7 in (a) of FIG. 5), one picture is selected between the pictures I0 and P1 for each macroblock of the picture P6 as a reference picture of the picture P6 as shown in (a) of FIG. 5, for example. In other words, the pictures I0 and P1 are selectable as reference pictures of the picture P6.

According to the reference method corresponding to the motion flag information indicating OFF, the reference index assignment unit 102 assigns the reference index 0 (shown as RefIdx0 in FIG. 5) to the picture I0, and the reference index 1 (shown as RefIdx1 in FIG. 5) to the picture P1.

Likewise, among the pictures P1 and P6 that are selectable as reference pictures of the picture P7, the reference index assignment unit 102 assigns the reference index 0 to the picture P1, and the reference index 1 to the picture P6.

On the other hand, according to the reference method corresponding to the motion flag information indicating ON, among the pictures I0 and P1 that are selectable as reference pictures of the picture P6, the reference index assignment unit 102 assigns the reference index 0 to the picture P1 that is one of the reference pictures closer to the picture P6, as shown in (b) in FIG. 5, for example. Further, the reference index assignment unit 102 assigns the reference index 1 to the picture I0 that is the other reference picture.

Further, among the pictures P1 and P6 that are selectable as reference pictures of the picture P7, the reference index assignment unit 102 assigns the reference index 0 to the picture P6 that is one of the reference pictures closer to the picture P7. Furthermore, the reference index assignment unit 102 assigns the reference index 1 to the picture P1 that is the other reference picture.

In such a manner, in the case where the current picture is to be field-coded as a P-picture, the reference index assignment unit 102 assigns, to one of two reference pictures which is temporally closer to the current picture to be coded and which has a parity opposite to that of the current picture to be coded, a reference index having a value smaller than the value of a reference index to be assigned to the other reference picture having the same parity as that of the current picture to be coded.

Next, with reference to (a) and (b) in FIG. 6, an example of a method for determining a reference method for B-pictures will be described.

In FIG. 6, (a) specifically shows a reference method corresponding to the motion flag information indicating OFF, and (b) specifically shows a reference method corresponding to the motion flag information indicating ON, in the case where the current picture is to be coded as a B-picture and belongs to a frame temporally next to a P-picture. The connotation of the arrows in the diagram is the same as in (a) and (b) of FIG. 5.

In the case where the current picture is to be coded as a B-picture and belongs to a frame temporally next to a P-picture (the pictures B2 and B3 in (a) of FIG. 6), the pictures I0 and P1 are selectable as reference pictures of the picture B2 in L0 prediction, and the pictures P6 and P7 are selectable as reference pictures of the picture B2 in L1 prediction, as shown in (a) in FIG. 6, for example.

Further, the pictures P1 and B2 are selectable as reference pictures of the picture B3 in L0 prediction, and the pictures P6 and P7 are selectable as reference pictures of the picture B3 in L1 prediction.

According to the reference method corresponding to the motion flag information indicating OFF, among the plural reference pictures of the picture B2, the reference index assignment unit 102 assigns the reference index 0 (shown as RefIdx0 in (a) in FIG. 6) to the picture I0, and the reference index 1 (shown as RefIdx1 in (a) in FIG. 6) to the picture P1. Further, the reference index assignment unit 102 assigns the reference index 0 to the picture P6, and the reference index 1 to the picture P7.

Moreover, among the plural reference pictures of the picture B3, the reference index assignment unit 102 assigns the reference index 0 to the picture P1, the reference index 1 to the picture B2, the reference index 1 to the picture P6, and the reference index 0 to the picture P7.

On the other hand, according to the reference method corresponding to the motion flag information indicating ON, among the pictures I0 and P1 that are selectable as reference pictures of the picture B2 in L0 prediction, the reference index assignment unit 102 assigns the reference index 0 to the picture P1 that is one of the reference pictures closer to the picture B2, as shown in (b) in FIG. 6, for example. Further, the reference index assignment unit 102 assigns the reference index 1 to the picture I0 that is the other reference picture.

Furthermore, among the pictures P6 and P7 that are selectable as reference pictures of the picture B2 in L1 prediction, the reference index assignment unit 102 assigns the reference index 0 to the picture P6 that is one of the reference pictures closer to the picture B2. Moreover, the reference index assignment unit 102 assigns the reference index 1 to the picture P7 that is the other reference picture.

Further, among the pictures P1 and B2 that are selectable as reference pictures of the picture B3 in L0 prediction, the reference index assignment unit 102 assigns the reference index 0 to the picture B2 that is one of the reference pictures closer to the picture B3. Furthermore, the reference index assignment unit 102 assigns the reference index 1 to the picture P1 that is the other reference picture.

Furthermore, among the pictures P6 and P7 that are selectable as reference pictures of the picture B3 in L1 prediction, the reference index assignment unit 102 assigns the reference index 0 to the picture P6 that is one of the reference pictures closer to the picture B3. Moreover, the reference index assignment unit 102 assigns the reference index 1 to the picture P7 that is the other reference picture.

Next, with reference to (a) and (b) in FIG. 7, another example of a method for determining a reference method for B-pictures will be described.

In FIG. 7, (a) specifically shows a reference method corresponding to the motion flag information indicating OFF, and (b) specifically shows a reference method corresponding to the motion flag information indicating ON, in the case where the current picture is to be coded as a B-picture and belongs to a frame temporally just ahead of a P-picture. The connotation of the arrows in the diagram is the same as in (a) and (b) of FIG. 5.

In the case where the current picture is to be coded as a B-picture and belongs to a frame temporally just ahead of a P-picture (the pictures B4 and B5 in (a) of FIG. 7), the pictures B2 and B3 are selectable as reference pictures of the picture B4 in L0 prediction, and the pictures P6 and P7 are selectable as reference pictures of the picture B4 in L1 prediction as shown in (a) in FIG. 7, for example.

Further, the pictures B2 and B3 are selectable as reference pictures of the picture B5 in L0 prediction, and the pictures P6 and P7 are selectable as reference pictures of the picture B5 in L1 prediction.

According to the reference method corresponding to the motion flag information indicating OFF, among the plural reference pictures of the picture B4, the reference index assignment unit 102 assigns the reference index 0 (shown as RefIdx0 in (a) in FIG. 7) to the picture B2, and the reference index 1 (shown as RefIdx1 in (a) in FIG. 7) to the picture B3. Furthermore, the reference index assignment unit 102 assigns the reference index 0 to the picture P6, and the reference index 1 to the picture P7.

Moreover, among the plural reference pictures of the picture B5, the reference index assignment unit 102 assigns the reference index 1 to the picture B2, the reference index 0 to the picture B3, the reference index 1 to the picture P6, and the reference index 0 to the picture P7.

On the other hand, according to the reference method corresponding to the motion flag information indicating ON, among the pictures B2 and B3 that are selectable as reference pictures of the picture B4 in L0 prediction, the reference index assignment unit 102 assigns the reference index 0 to the picture B3 that is one of the reference pictures closer to the picture B4 as shown in (b) in FIG. 7, for example. Further, the reference index assignment unit 102 assigns the reference index 1 to the picture B2 that is the other reference picture.

Further, among the pictures P6 and P7 that are selectable as reference pictures of the picture B4 in L1 prediction, the reference index assignment unit 102 assigns the reference index 0 to the picture P6 that is one of the reference pictures closer to the picture B4. Furthermore, the reference index assignment unit 102 assigns the reference index 1 to the picture P7 that is the other reference picture.

Moreover, among the pictures B2 and B3 that are selectable as reference pictures of the picture B5 in L0 prediction, the reference index assignment unit 102 assigns the reference index 0 to the picture B3 that is one of the reference pictures closer to the picture B5. Further, the reference index assignment unit 102 assigns the reference index 1 to the picture B2 that is the other reference picture.

Further, among the pictures P6 and P7 that are selectable as reference pictures of the picture B5 in L1 prediction, the reference index assignment unit 102 assigns the reference index 0 to the picture P6 that is one of the reference pictures closer to the picture B5. Furthermore, the reference index assignment unit 102 assigns the reference index 1 to the picture P7 that is the other reference picture.

In such a manner, in the case where the current picture is to be field-coded as a B-picture and is a top field, the reference index assignment unit 102 assigns to, among the two reference pictures temporally ahead of the current picture to be coded, a reference picture which is temporally closer to the current picture to be coded and which has a parity opposite to that of the current picture to be coded, a reference index having a value smaller than the value of a reference index to be assigned to the other reference picture having the same parity as that of the current picture to be coded.

As described thus far, the motion flag generation unit 101 determines motion flag information based on the input image additional information of the input image data. Further, when the motion flag information received from the motion flag generation unit 101 indicates ON, the reference index assignment unit 102 determines a reference method so that a reference index with a smaller value is assigned to a reference picture temporally closer to the current picture to be coded.

Further, when the motion flag information received from the motion flag generation unit 101 indicates OFF, the reference index assignment unit 102 determines a reference method so that a reference index with a smaller value is assigned to a reference picture having the same parity as that of the current picture to be coded.

In such a manner as above, through the control over the reference index assignment to the reference pictures, the reference index of a reference picture which, among plural reference pictures, many motion vectors point to can be set to a smaller value, that is, a value with less amount of information (coded amount). This makes it possible to enhance the image quality and the coding efficiency without causing deterioration in the coding efficiency even in a scene with large motions in the pictures.

It is to be noted that the image coding apparatus 100 does not have to determine whether or not a current picture to be coded is a picture included in a group of successive pictures showing a motion of a predetermined or greater amount. For example, the image coding apparatus 100 may select, without the above determination, the reference method corresponding to the motion flag information indicating ON in the case where it is highly likely that each picture included in video data to be coded shows a large motion, as in the case of video data obtained from a camera used for monitoring of constantly moving objects.

Embodiment 2

Figure 8:
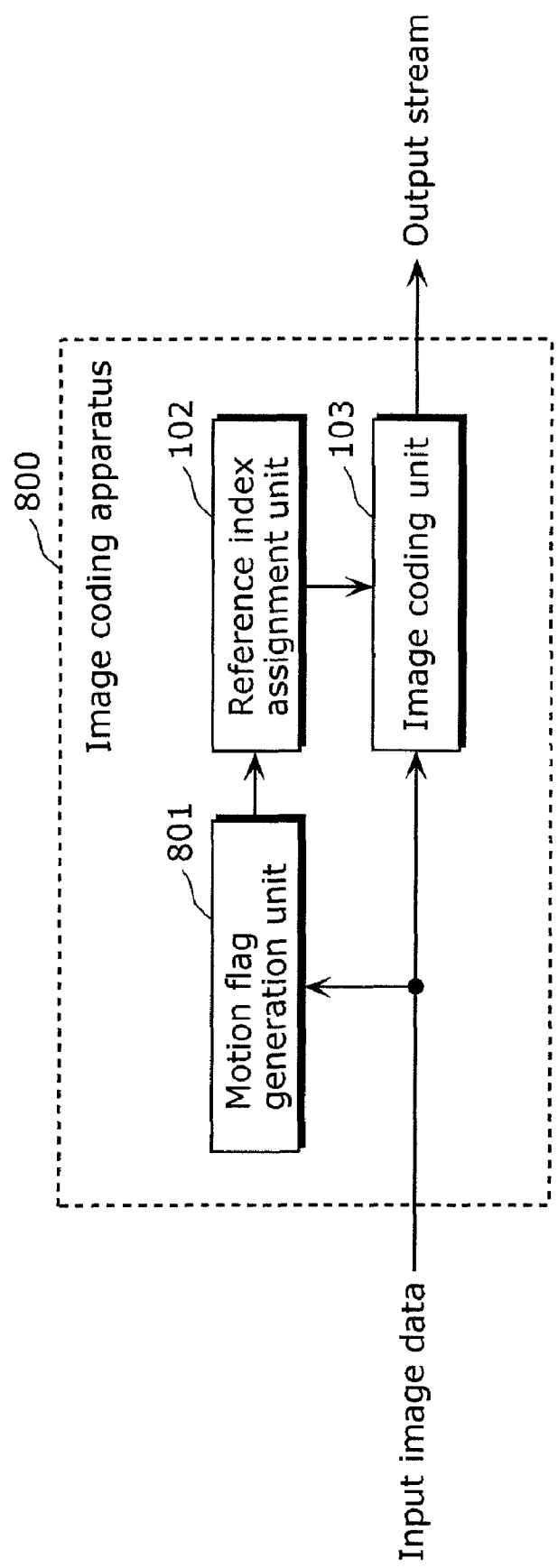
FIG. 8 is a block diagram showing the structure of an image coding apparatus according to Embodiment 2 of the present invention.

FIG. 8 is a block diagram showing the structure of an image coding apparatus 800 according to Embodiment 2 of the present invention.

As shown in FIG. 8, the image coding apparatus 800 includes a motion flag generation unit 801, a reference index assignment unit 102, and an image coding unit 103.

The motion flag generation unit 801 receives input image data, rather than input image additional information. The motion flag generation unit 801 generates motion flag information using pixel information of the received input image data, and outputs the motion flag information to the reference index assignment unit 102.

It is to be noted that the reference index assignment unit 102 and the image coding unit 103 are the same as in Embodiment 1 of the present invention, and are thus given the same reference numerals and the descriptions thereof are omitted here.

Next, processing performed by the motion flag generation unit 801 of the image coding apparatus 800 having the above structure will be described.

Initially, input image data is provided to the image coding unit 103 and to the motion flag generation unit 801. The motion flag generation unit 801 determines, based on pixel information of the received input image data, whether or not a current picture to be coded is a picture included in a group of successive pictures showing a motion of a predetermined or greater amount.

That is to say, the motion flag generation unit 801 determines whether or not the input image data is an image including a large motion, based on the pixel information of the received input image data.

When determining that the input image data is image data including a large motion, the motion flag generation unit 801 generates motion flag information indicating ON; otherwise, generates motion flag information indicating OFF. The motion flag generation unit 801 outputs the motion flag information to the reference index assignment unit 102.

Next, with reference to FIG. 9, an example of processing performed by the motion flag generation unit 801 will be described.

Figure 9:
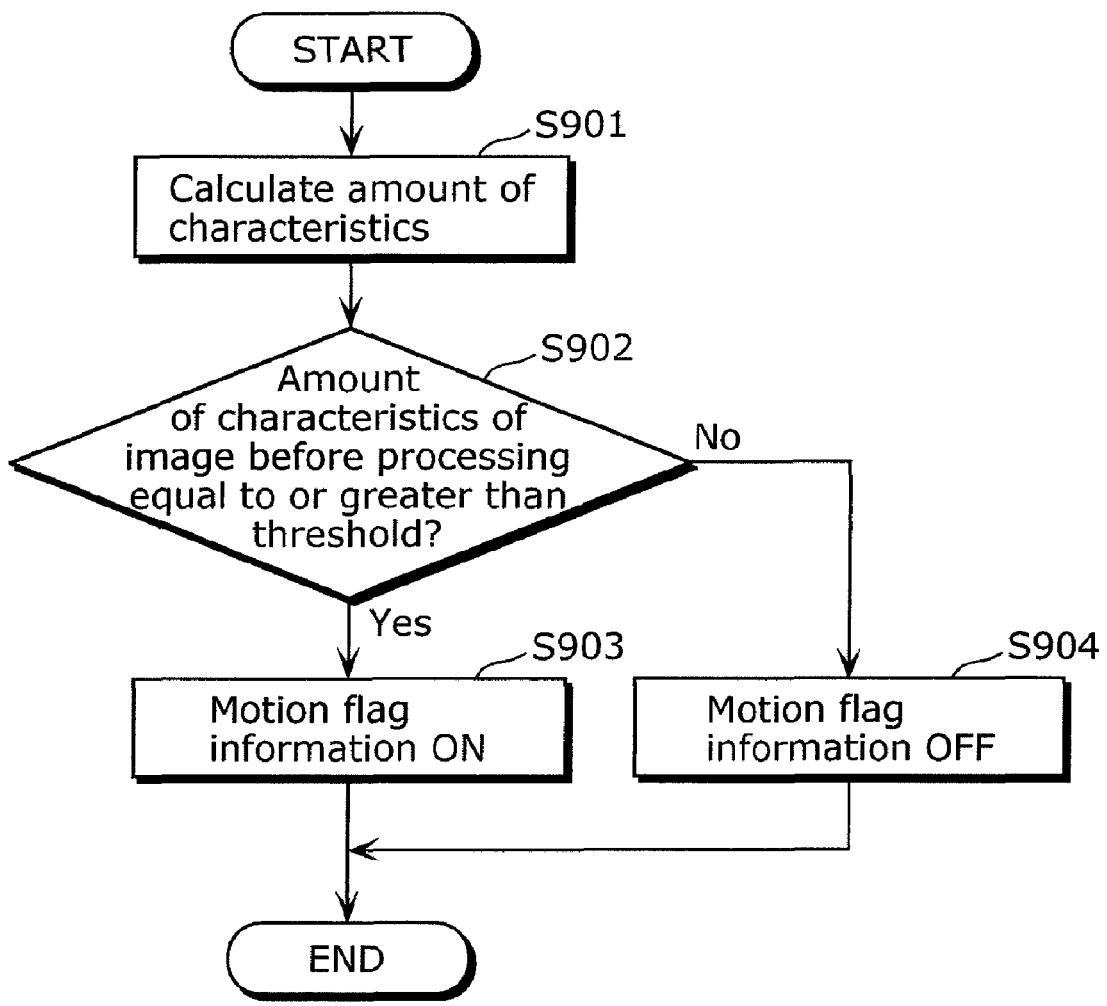
FIG. 9 is a flowchart showing an example of processing performed by a motion flag generation unit of an image coding apparatus according to Embodiment 2 of the present invention.

FIG. 9 is a flowchart showing an example of processing performed by the motion flag generation unit 801 of the image coding apparatus 800 according to Embodiment 2 of the present invention.

As shown in FIG. 9, the motion flag generation unit 801 calculates an amount of characteristics of a motion vector before processing, using the input image data (S901). Further, the motion flag generation unit 801 determines whether or not the amount of characteristics of an image before processing, which has been calculated in S901, is equal to or greater than a predetermined threshold (S902).

In other words, the motion flag generation unit 801 determines whether or not the amount of characteristics of a current picture to be coded before being coded is equal to or greater than the threshold.

When determining that the calculated amount of characteristics is equal to or greater than the threshold (Yes in S902), the motion flag generation unit 801 generates and outputs motion flag information indicating ON (S903).

Further, when determining that the calculated amount of characteristics is smaller than the predetermined threshold (No in S902), the motion flag generation unit 801 generates and outputs motion flag information indicating OFF (S904).

Here, the amount of characteristics of an image before processing, which is calculated using the input image data, is a value calculated from a current picture to be coded and a previous picture to be coded. To be more specific, it is, for example, a sum of absolute values of X component and Y component of each motion vector, or a magnitude of a Euclidean norm motion vector representing a distance between two points, calculated from a current input image and a previous input image.

The previous input image may be a previous input image corresponding to a reference picture to be used for coding the current input image. Further, the previous input image may be an input image provided immediately ahead of the current input image. Furthermore, the previous input image is not limited to such images.

For example, when a desired previous input image cannot be used as above due to a circuit design or other reasons, a different previous input image, such as one provided a few frames ahead of the current input image, may be used.

Further, a motion vector between a current input image and a previous input image is, for example, a representative vector that is representative of motion vectors detected through motion vector detection performed within a predetermined search range of a current reduced input image and a previous reduced input image. It is to be noted that the current reduced input picture and the previous reduced input picture can be obtained by reducing the current input image and the previous input image.

Further, the representative vector is, for example, an average of plural motion vectors, but it is not limited to this, and may be determined using statistical processing or the like.

It is to be noted that the flow of processing performed by the image coding apparatus 800 after the processing shown in FIG. 9 is the same as that of the image coding apparatus 100 in Embodiment 1. In other words, as shown in FIG. 4, in the case where the motion flag information indicating ON is received, the image coding unit 103 selects the reference method corresponding to the flag indicating ON.

That is to say, the image coding apparatus 800 determines a reference method so that a reference index having a smaller value is assigned to a reference picture temporally closer to the current picture to be coded.

Therefore, as with the image coding apparatus 100 of Embodiment 1, the image coding apparatus 800 of Embodiment 2 can enhance the image quality and the coding efficiency without causing deterioration in the coding efficiency even in a scene with large motions in the pictures.

Embodiment 3

Figure 10:
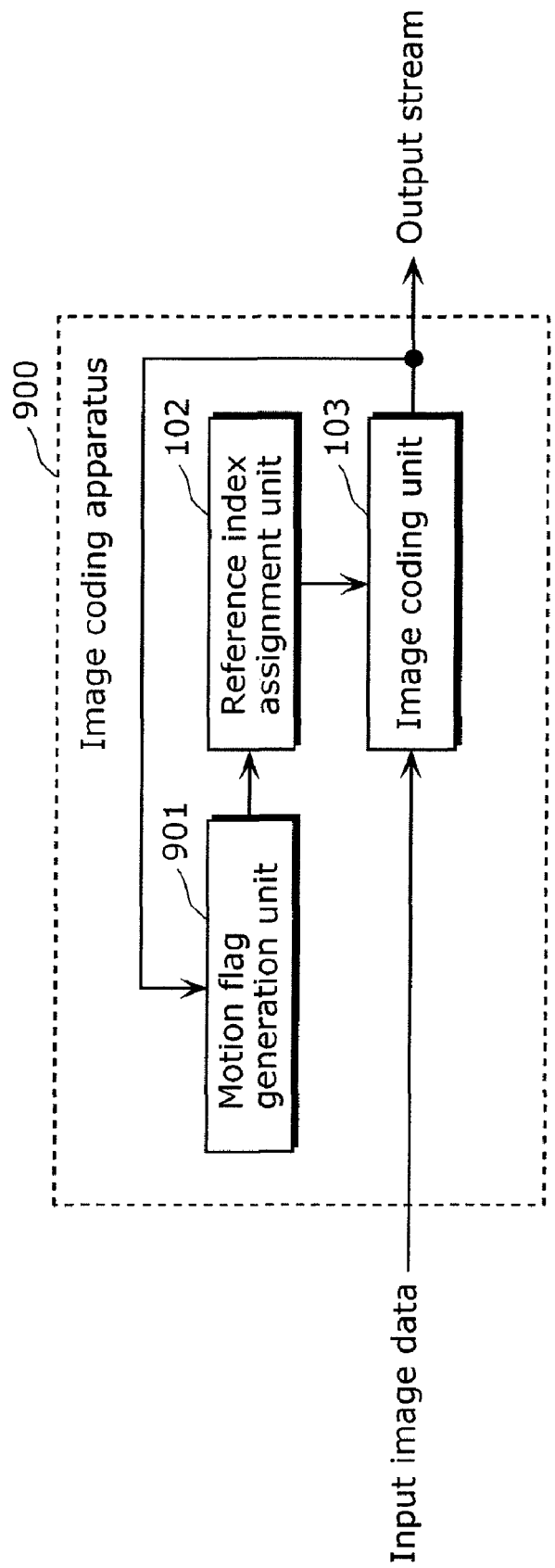
FIG. 10 is a block diagram showing the structure of an image coding apparatus according to Embodiment 3 of the present invention.

FIG. 10 is a block diagram showing the structure of an image coding apparatus 900 according to Embodiment 3 of the present invention.

As shown in FIG. 10, the image coding apparatus 900 includes a motion flag generation unit 901, a reference index assignment unit 102, and an image coding unit 103.

The motion flag generation unit 901 generates motion flag information using image coding information of a picture coded and generated by the image coding unit 103 prior to current input image data (current picture to be coded). The motion flag generation unit 901 outputs the motion flag information to the reference index assignment unit 102.

The reference index assignment unit 102 and the image coding unit 103 are the same as in Embodiment 1 of the present invention, and are thus given the same reference numerals and the descriptions thereof are omitted here.

Next, processing performed by the motion flag generation unit 901 of the image coding apparatus 900 having the above structure will be described.

Initially, input image data is provided to the image coding unit 103. As in Embodiments 1 and 2 of the present invention, the image coding unit 103 performs compression-coding on image data of a current picture to be coded included in the input image data in accordance with the H.264 compression-coding standard and outputs the resultant as an output stream, according to reference method determining information provided by the reference index assignment unit 102.

Further, the image coding unit 103 outputs, to the motion flag generation unit 901, image coding information, that is, information which was used for the compression-coding of the image data of the current picture to be coded included in the input image data.

The motion flag generation unit 901 receives the image coding information from the image coding unit 103. Using the image coding information of the picture coded and generated by the image coding unit 103 prior to a current picture to be coded, the motion flag generation unit 901 determines whether or not the current picture to be coded is a picture included in a group of successive pictures showing a motion of a predetermined or greater amount. That is to say, the motion flag generation unit 901 determines whether or not the input image data is an image including a large motion.

When determining that the input image data is image data including a large motion, the motion flag generation unit 901 generates motion flag information indicating ON; otherwise, generates motion flag information indicating OFF. The motion flag generation unit 901 outputs the motion flag information to the reference index assignment unit 102.

It is to be noted that in the above description, the image coding unit 103 sends the image coding information to the motion flag generation unit 901. However, the present invention is not limited to this, and the image coding unit 103 may send an output stream including the image coding information to the motion flag generation unit 901.

In this case, however, the motion flag generation unit 901 needs to have a function to extract the image coding information from the output stream received from the image coding unit 103.

Next, with reference to FIG. 11, an example of processing performed by the motion flag generation unit 901 will be described.

Figure 11:
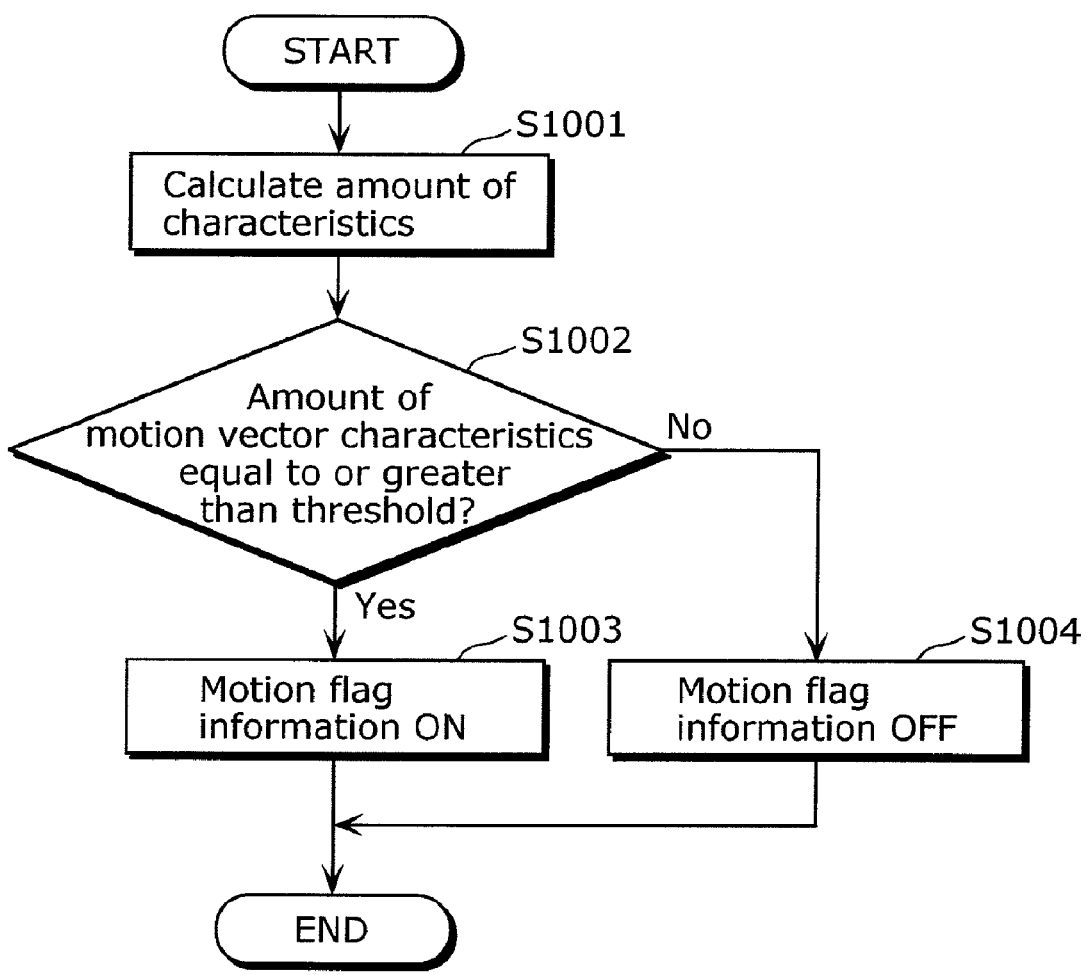
FIG. 11 is a flowchart showing an example of processing performed by a motion flag generation unit of an image coding apparatus according to Embodiment 3 of the present invention.

FIG. 11 is a flowchart showing an example of processing performed by the motion flag generation unit 901 of the image coding apparatus 900 according to Embodiment 3 of the present invention.

As shown in FIG. 11, the motion flag generation unit 901 initially calculates an amount of coded motion vector characteristics using image coding information of a picture coded and outputted by the image coding unit 103 prior to current input image data (S1001). Next, the motion flag generation unit 901 determines whether or not the amount of coded motion vector characteristics calculated in S1001 is equal to or greater than a predetermined threshold (S1002).

When determining in S1002 that the amount of coded motion vector characteristics is equal to or greater than the predetermined threshold (Yes in S1002), the motion flag generation unit 901 outputs motion flag information indicating ON to the reference index assignment unit 102 (S1003). When determining that the amount of coded motion vector characteristics is smaller than the predetermined threshold (No in S1002), the motion flag generation unit 901 outputs motion flag information indicating OFF to the reference index assignment unit 102 (S1004).

Here, the image coding information of the picture coded and outputted by the image coding unit 103 prior to the current input image data is, for example, a motion vector coded for each macroblock and a parameter other than a motion vector.

Further, the amount of coded motion vector characteristics is, for example, an average of motion vectors of the coded picture, an average of absolute values of the motion vectors of the coded picture, and variance of the motion vectors of the coded picture.

It is to be noted that the flow of processing performed by the image coding apparatus 900 after the processing shown in FIG. 11 is the same as that of the image coding apparatus 100 in Embodiment 1. In other words, as shown in FIG. 4, in the case where the motion flag information indicating ON is received, the image coding unit 103 selects the reference method corresponding to the flag indicating ON.

That is to say, the image coding apparatus 900 determines a reference method so that a reference index having a smaller value is assigned to a reference picture temporally closer to the current picture to be coded.

Therefore, as with the image coding apparatus 100 of Embodiment 1, the image coding apparatus 900 of Embodiment 3 can enhance the image quality and the coding efficiency without causing deterioration in the coding efficiency even in a scene with large motions in the pictures.

As described above, each of the image coding apparatuses according to Embodiments 1 to 3 of the present invention generates motion flag information using: the motion flag generation unit 101 based on input image additional information, which is additional information of input image data; the motion flag generation unit 801 based on pixel information of the input image data; or the motion flag generation unit 901 based on image coding information that is information of a picture coded prior to current input image data and is generated by the image coding unit 103. Then, each image coding apparatus outputs the motion flag information to the reference index assignment unit 102.

Further, the reference index assignment unit 102 determines a reference method to be used for coding, and outputs the reference method to the image coding unit 103. The image coding unit 103 codes the input image data based on the reference method provided by the reference index assignment unit 102, and outputs a stream.

Each of the image coding apparatuses according to Embodiments 1 to 3 of the present invention can enhance the coding efficiency because having such a functional structure as above allows assignment of appropriate reference indices according to the characteristics of input image data.

It is to be noted that three different methods have been described in Embodiments 1 to 3 of the present invention as a method for determining how reference indices are to be assigned for coding input image data. The three methods, however, may be combined to determine how reference indices are to be assigned for coding input image data.

Thus far, Embodiments 1 to 3 of the present invention have been described, but the present invention is not limited to such embodiments. For example, Embodiment 1 of the present invention has illustrated, as an example of the input image additional information, information indicating whether or not input image data has been captured by panning.

However, the contents of the input image additional information are not limited to this, and may indicate whether or not input image data has been captured by zooming, or whether or not input image data has been captured by tilting.

In addition, Embodiments 1 to 3 of the present invention have illustrated the example case of generating motion flag information using at least one of: pixel information of input image data; input image additional information, which is additional information of input image data; and image coding information of a picture coded prior to input image data.

However, the way of generating motion flag information is not limited to this. In the case of decoding an MPEG-2 coded stream and coding the decoded stream in accordance with the H.264 compression-coding standard, motion flag information may be generated using, for example, an average of motion vectors of macroblocks obtained at the time of decoding the MPEG-2 coded stream.

Moreover, Embodiments 1 to 3 of the present invention have illustrated that in the case of coding a B-picture, a reference picture pointed to by a motion vector can be selected from among four reference pictures. The present invention, however, is not limited to this, and may also be applied to the case of, for example, selecting a reference picture pointed to by a motion vector from among three reference pictures.

Further, Embodiments 1 to 3 of the present invention have illustrated the example case of adaptively switching, for every picture, the method of reference index assignment, irrespective of whether the current picture to be coded is a P-picture or a B-picture. The present invention, however, is not limited to this, and may be applied to P-pictures only, or bottom fields only, for example.

Furthermore, Embodiments 1 to 3 of the present invention have illustrated the example case of adopting H.264 as a compression-coding scheme. The present invention, however, is not limited to this, and may be applied to any compression-coding schemes having a function to manage reference pictures by assignment of reference indices.

As described above, the image coding apparatus of the present invention determines a method of reference index assignment for coding input image data, in such a manner that a reference index having a smaller value is assigned to a reference picture temporally closer to the current picture to be coded.

That is to say, since the coding processing is performed in such a manner that increase in the coded amount obtained by coding is suppressed, the efficiency in coding input image data can be enhanced.

Thus, the image coding apparatus according to the present invention can enhance the image quality and the coding efficiency without causing deterioration in the coding efficiency even in a scene with large motions in the pictures.

Figure 12:
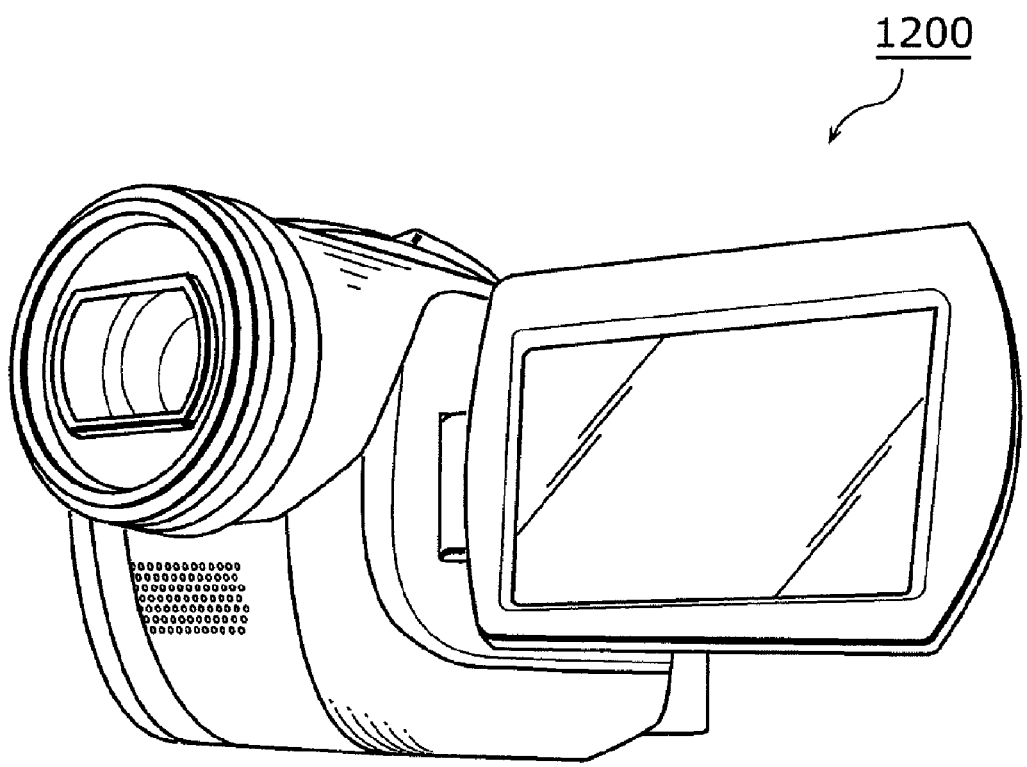
FIG. 12 is a perspective view showing the exterior of a camera in a variation of an embodiment of the present invention.
Figure 13:
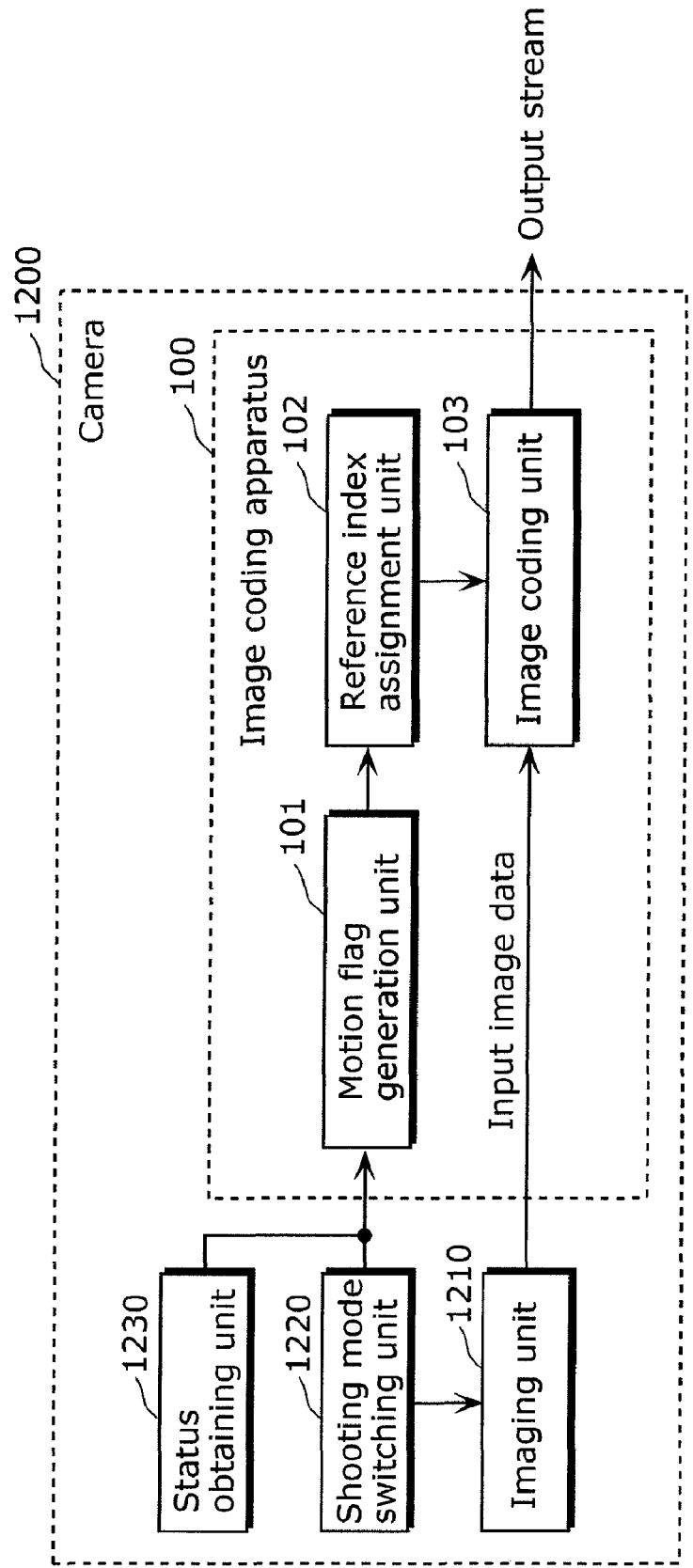
FIG. 13 is a block diagram showing an example of the structure of a camera in a variation of an embodiment of the present invention.

It is to be noted that the present invention can be realized as a camera 1200 as shown in FIGS. 12 and 13.

FIG. 12 is a perspective view showing the exterior of the camera 1200 in a variation of the embodiments of the present invention.

FIG. 13 is a block diagram showing an example of the structure of the camera 1200 in the variation of the embodiments of the present invention.

The camera 1200 shown in FIGS. 12 and 13 is an imaging apparatus which codes video data obtained by imaging an object, and records the coded video data on a recording medium or sends the coded video data to an external apparatus.

The camera 1200 includes an image coding apparatus 100, an imaging unit 1210, a shooting mode switching unit 1220, and a status obtaining unit 1230.

The image coding apparatus 100 is the same as the one described in Embodiment 1, and is thus given the same reference numeral and the description thereof is omitted.

The imaging unit 1210 is a structural element which images an object and has an optical lens, an image sensor and so on. The video data obtained by the imaging unit 1210 imaging an object is provided to the image coding apparatus 100 as input image data.

The status obtaining unit 1230 is a structural element which obtains status information indicating, for example, that the camera 1200 is panning or zooming.

The status obtaining unit 1230 obtains the status information from, for example, a zoom button (not shown) and an acceleration sensor (not shown) that are included in the camera 1200.

The shooting mode switching unit 1220 is a structural element which switches between shooting modes of the camera 1200. For example, the shooting mode switching unit 1220 obtains an instruction from a user of the camera 1200 and instructs the imaging unit 1210 to switch to a shooting mode according to the instruction. The imaging unit 1210 changes the zoom, aperture or the like according to the instructed shooting mode.

The operation of the camera 1200 having the above-described structure will be briefly described.

For example, when the camera 1200 is panning to shoot scenery, the status obtaining unit 1230 obtains, from for instance the acceleration sensor, status information indicating that the camera 1200 is panning.

The status obtaining unit 1230 outputs the status information to the motion flag generation unit 101 of the image coding apparatus 100. Upon receiving the status information indicating that the camera 1200 is panning, the motion flag generation unit 101 generates motion flag information indicating ON and outputs the motion flag information to the reference index assignment unit 102 (S302 in FIG. 3).

After that, the reference index assignment unit 102 selects a reference method corresponding to the motion flag indicating ON (S402 in FIG. 4). That is to say, a reference index having a smaller value is assigned to a reference picture temporally closer to the current picture to be coded.

As a result, it is possible to enhance the image quality and the coding efficiency without causing deterioration in the coding efficiency even when panning of the camera 1200 produces a scene with large motions in the pictures.

It is to be noted that instead of receiving the motion flag information indicating ON, the reference index assignment unit 102 may receive status information indicating that the camera 1200 is panning and the like. That is to say, the reference index assignment unit 102 may receive the status information to select a reference method corresponding to the motion flag indicating ON.

Here, assume a case where a user has instructed the shooting mode switching unit 1220 to switch to "sports mode", for example.

The "sports mode" is an example of a predetermined shooting mode of the camera according to the present invention. The "sports mode" is a shooting mode selected when shooting a moving player while following the player's movement, for example.

In this case, the shooting mode switching unit 1220 instructs the imaging unit 1210 to switch to "sports mode", and outputs, to the motion flag generation unit 101 of the image coding apparatus 100, information indicating that the current mode is switched to "sports mode".

Upon receiving the information indicating that mode of the camera 1200 is switched to "sports mode", the motion flag generation unit 101 generates motion flag information indicating ON and outputs the motion flag information to the reference index assignment unit 102 (S302 in FIG. 3).

After that, the reference index assignment unit 102 selects a reference method corresponding to the motion flag indicating ON (S402 in FIG. 4). That is to say, a reference index having a smaller value is assigned to a reference picture temporally closer to the current picture to be coded.

As a result, it is possible to enhance the image quality and the coding efficiency without causing deterioration in the coding efficiency even when the user of the camera 1200 takes an action for producing a scene with large motions in the pictures.

It is to be noted that instead of receiving the motion flag information indicating ON, the reference index assignment unit 102 may receive the information indicating that the mode of the camera 1200 is switched to "sports mode". That is to say, the reference index assignment unit 102 may receive the information indicating that the mode of the camera 1200 is switched to a predetermined shooting mode, to select the reference method corresponding to the motion flag indicating ON.

As described, the camera 1200 obtains a status indicating whether or not the camera 1200 is panning or the like, and controls, based on the status, the method of reference index assignment to reference pictures.

In addition, the camera 1200 also controls the method of reference index assignment to reference pictures, based on a shooting mode determined according to an explicit user instruction.

That is to say, the camera 1200 can determine a method of reference index assignment to reference pictures according to the status of the camera 1200 without the awareness of the user, in such a manner that the image quality and the coding efficiency are enhanced. Further, the camera 1200 can also determine a method of reference index assignment to reference pictures according the switching between shooting modes based on an explicit user instruction, in such a manner that the image quality and the coding efficiency are enhanced.

Moreover, the present invention can provide not only an image coding apparatus having each unit of Embodiments 1 to 3 of the present invention, but also: an image coding method including the units of the image coding apparatus as steps; an image coding integrated circuit which implements the function of the image coding apparatus; and an image coding program for implementing the image coding method.

Further, the image coding program can be distributed via a recording medium such as a Compact Disc-Read Only Memory (CD-ROM), and a communication network such as the Internet.

Furthermore, the image coding integrated circuit may be implemented in the form of an LSI that is a typical integrated circuit. In this case, LSI may include one chip or plural chips. For example, the functional blocks other than the memory may be implemented on a one-chip LSI. It is to be noted that the name used here is LSI, but it may also be called IC, system LSI, super LSI, or ultra LSI depending on the degree of integration.

Figure 14:
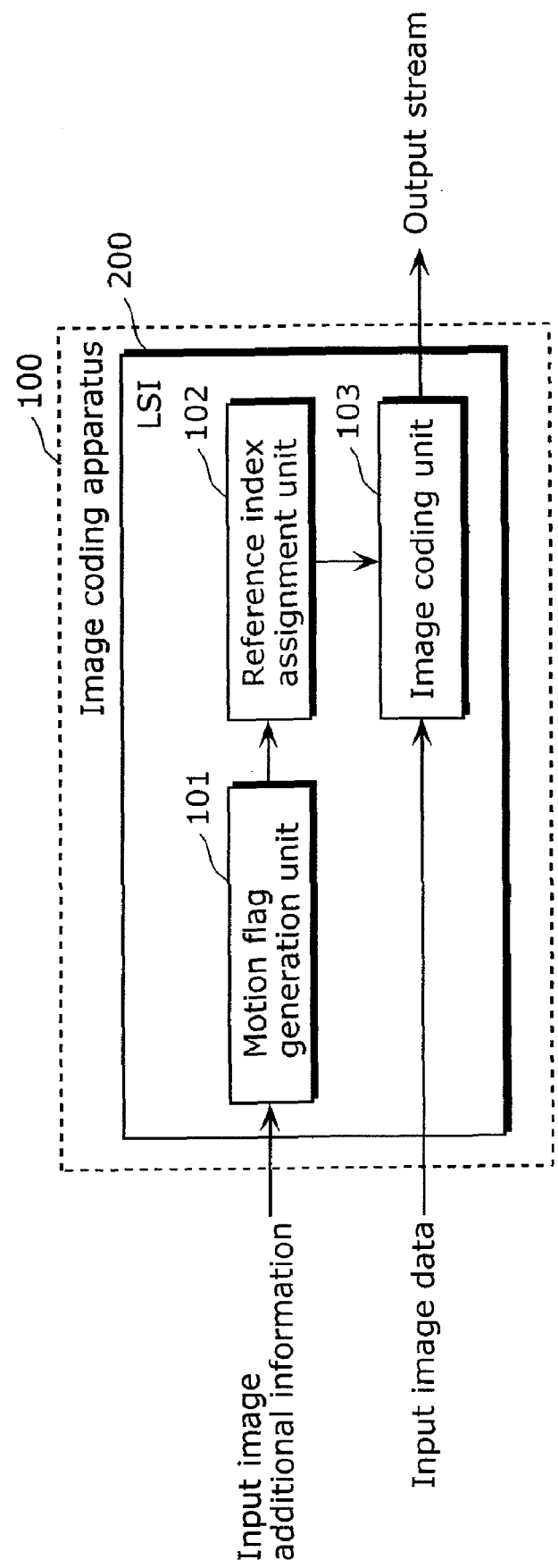
FIG. 14 shows an example of circuit integration in an image coding apparatus of Embodiment 1.
Figure 15:
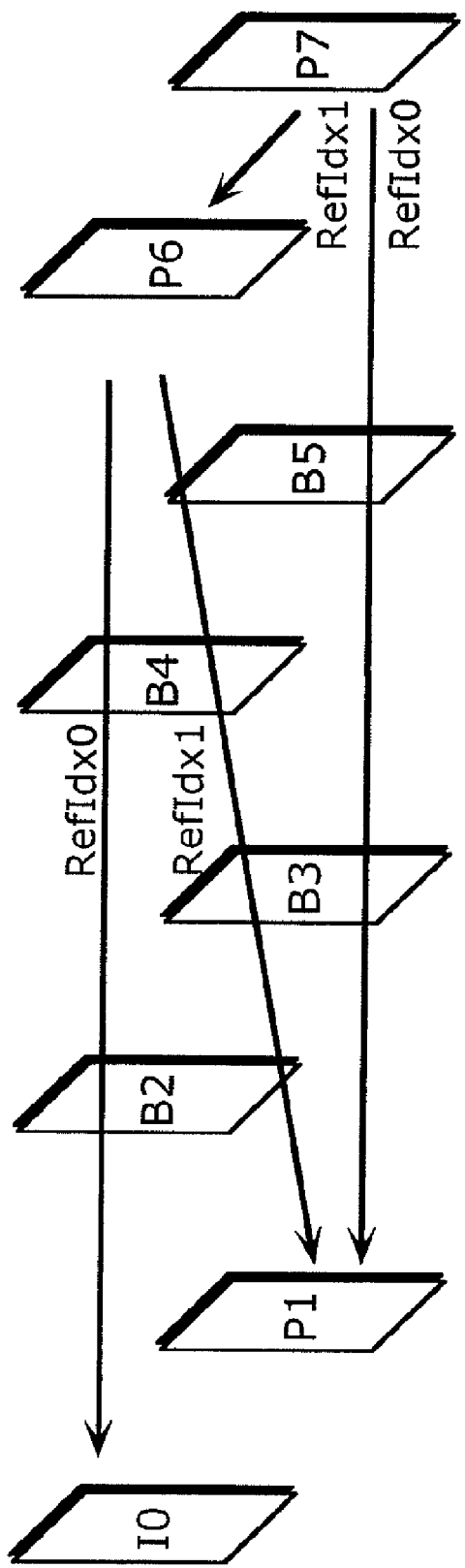
FIG. 15 shows an example of a conventional method of reference index assignment in the case where a current picture is to be coded as a P-picture.

FIG. 14 shows an example of circuit integration in the image coding apparatus 100 of Embodiment 1.

An LSI 200 shown in FIG. 14 is an example of the image coding integrated circuit of the present invention, and is an example of an integrated circuit that includes plural functional blocks of the image coding apparatus 100.

It is to be noted that these functional blocks do not have to be included in a single LSI, but may be dispersedly included in plural LSIs.

Further, as also for the image coding apparatus 800 of Embodiment 2 and the image coding apparatus 900 of Embodiment 3, it is possible to partially or entirely include their functional blocks in an integrated circuit.

Moreover, ways to achieve circuit integration are not limited to LSI, and a special circuit or a general purpose processor and so forth can also achieve the integration. It is also possible to use: Field Programmable Gate Array (FPGA) that can be programmed after LSI manufacturing; or a reconfigurable processor which can reconfigure the connection or setting of a circuit cell inside the LSI.

In addition, if a technology of circuit integration that supersedes the LSI is introduced as a result of development in the semiconductor technology or another derivative technology, integration of the functional blocks can surely be implemented using that technology. For example, biotechnology is considered as one such possibility.

Further, when implementing an integrated circuit, the units which store data among the functional blocks may be separately implemented rather than being included in a one-chip structure.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The image coding apparatus, the image coding method, and the image coding integrated circuit according to the present invention achieve higher image quality or higher coding efficiency in coding video in accordance with a compression-coding scheme such as H.264. Therefore, they are applicable to personal computers, HDD recorders, DVD recorders, camera mobile phones and so on.

In addition, the camera according to the present invention can achieve, in the same manner, higher image quality or higher coding efficiency in coding video in accordance with a compression-coding scheme such as H.264. Therefore, it is applicable to camcorders for home use and business use and so on.

What is claimed is:

1. An image coding apparatus which performs field-coding on input image data, the image coding apparatus comprising:
a reference index assignment unit configured to assign reference indices to plural reference pictures which are referred to by a current picture to be coded included in the input image data, each of the reference indices having a different value and being assigned to a corresponding one of the plural reference pictures; and
an image coding unit configured to perform the field-coding on the current picture to be coded, by referring to the reference pictures indicated by the reference indices assigned by the reference index assignment unit, and to code the reference indices,
wherein the reference index assignment unit is configured to assign, to a reference picture having a parity opposite to a parity of the current picture to be coded, a reference index having a value smaller than a value of a reference index to be assigned to a reference picture having a same parity as the parity of the current picture to be coded, when reference indices are assigned to, among the plural reference pictures, two reference pictures which are two fields belonging to a same frame, one of which being a top field and the other of which being a bottom field.

2. The image coding apparatus according to claim 1, wherein, in the case where the current picture to be coded is a picture to be field-coded as a P-picture, the reference index assignment unit is configured to assign, to one of the two reference pictures which is temporally closer to the current picture to be coded and has a parity opposite to a parity of the current picture to be coded, a reference index having a value smaller than a value of a reference index to be assigned to the other reference picture having a same parity as the parity of the current picture to be coded.

3. The image coding apparatus according to claim 1, wherein, in the case where the current picture to be coded is a picture to be field-coded as a B-picture and is a top field, the reference index assignment unit is configured to assign, to one of the two reference pictures which is temporally closer to the current picture to be coded and has a parity opposite to a parity of the current picture to be coded, a reference index having a value smaller than a value of a reference index to be assigned to the other reference picture having a same parity as the parity of the current picture to be coded, the two reference pictures being temporally ahead of the current picture to be coded.

4. The image coding apparatus according to claim 1, further comprising:
a determination unit configured to determine whether or not the current picture to be coded is a picture included in a group of successive pictures showing a motion of a predetermined or greater amount,
wherein, (i) in the case where the determination unit determines that the current picture to be coded is included in the group of successive pictures, the reference index assignment unit is configured to assign, to the reference picture having the parity opposite to the parity of the current picture to be coded, a reference index having a value smaller than a value of a reference index to be assigned to the reference picture having the same parity as a parity of the current picture to be coded, when reference indices are assigned to, among the plural reference pictures, two reference pictures which are two fields belonging to at least one same frame, one of which being a top field and the other of which being a bottom field, and (ii) in the case where the determination unit determines that the current picture to be coded is not included in the group of successive pictures, the reference index assignment unit is configured to assign, to the reference picture having the same parity as the parity of the current picture to be coded, a reference index having a value smaller than a value of a reference index to be assigned to the reference picture having the parity opposite to the parity of the current picture to be coded, when reference indices are assigned to, among the plural reference pictures, two reference pictures which are two fields belonging to at least one same frame, one of which being a top field and the other of which being a bottom field.

5. The image coding apparatus according to claim 4, wherein the determination unit is configured to determine that the current picture to be coded is included in the group of successive pictures in the case of obtaining information indicating that the current picture to be coded is included in video data which has been captured by zooming or panning.

6. The image coding apparatus according to claim 4, wherein the determination unit is configured to determine that the current picture to be coded is included in the group of successive pictures in the case where an amount of characteristics is equal to or greater than a predetermined threshold, the amount of characteristics being a value calculated from the current picture to be coded and a previous picture to be coded.

7. The image coding apparatus according to claim 4, wherein the image coding unit is configured to perform the field-coding on each of plural pictures including the current picture to be coded, and
the determination unit is configured to determine that the current picture to be coded is included in the group of successive pictures in the case where an amount of characteristics is equal to or greater than a predetermined threshold, the amount of characteristics being a value calculated from plural motion vectors used for the field-coding performed by the image coding unit prior to the field-coding of the current picture to be coded.

* * * * *